United States Patent
Hosseini et al.

(10) Patent No.: US 11,070,310 B2
(45) Date of Patent: Jul. 20, 2021

(54) RATE-MATCHING ACROSS DOWNLINK TRANSMISSION REPETITIONS IN WIRELESS COMMUNICATIONS

(71) Applicant: QUALCOMM Incorporated, San Diego, CA (US)

(72) Inventors: Seyedkianoush Hosseini, San Diego, CA (US); Gabi Sarkis, San Diego, CA (US); Wei Yang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/399,466

(22) Filed: Apr. 30, 2019

(65) Prior Publication Data
US 2019/0342030 A1   Nov. 7, 2019

Related U.S. Application Data

(60) Provisional application No. 62/670,518, filed on May 11, 2018, provisional application No. 62/665,487, filed on May 1, 2018.

(51) Int. Cl.
| | |
|---|---|
| *H04L 1/00* | (2006.01) |
| *H04L 1/18* | (2006.01) |
| *H04W 72/04* | (2009.01) |
| *H04W 72/12* | (2009.01) |

(Continued)

(52) U.S. Cl.
CPC .............. *H04L 1/0013* (2013.01); *H04L 1/18* (2013.01); *H04L 5/0053* (2013.01); *H04L 5/0064* (2013.01); *H04W 56/0015* (2013.01); *H04W 72/042* (2013.01); *H04W 72/1268* (2013.01); *H04W 72/1289* (2013.01)

(58) Field of Classification Search
CPC ....... H04L 1/0013; H04L 1/18; H04L 5/0053; H04L 5/0064; H04W 56/0015; H04W 72/042; H04W 72/1268; H04W 72/1289
USPC ......................................... 370/310, 328, 329
See application file for complete search history.

(56) References Cited

U.S. PATENT DOCUMENTS

| | | | |
|---|---|---|---|
| 2016/0234859 A1 | 8/2016 | You et al. | |
| 2018/0035242 A1* | 2/2018 | Yi | ........................ H04L 5/0037 |
| 2019/0116592 A1* | 4/2019 | Moon | .................... H04L 5/0092 |

OTHER PUBLICATIONS

International Search Report and Written Opinion—PCT/US2019/030143—ISA/EPO—dated Aug. 28, 2019 (183224WO).

(Continued)

*Primary Examiner* — Obaidul Huq
(74) *Attorney, Agent, or Firm* — Michael DeHaemer, Jr.

(57) ABSTRACT

Methods, systems, and devices for wireless communications are described that provide for determining downlink control resources for transmitting control information to a user equipment (UE) that indicates downlink resources for a downlink transmission and a number of repetitions of the downlink transmission. The control information may be provided in a first transmission time interval (TTI), and the repetitions may span a number of TTIs. The UE may rate-match a shared channel containing the downlink transmission around the downlink control resources of the first TTI, and also perform the same rate-matching around corresponding resources in each subsequent TTI of the plurality of TTIs.

27 Claims, 23 Drawing Sheets

(51) Int. Cl.
*H04W 56/00* (2009.01)
*H04L 5/00* (2006.01)

(56) References Cited

OTHER PUBLICATIONS

Ericsson: "NB-IoT-Remaining Issues for NPDSCH Design," 3GPP Draft; R1-161986-NB-IoT—Remaining Issues for NPDSCH Design (Revision), 3rd Generation Partnership Project (3GPP), Mobile Competence Centre; 650, Route Des Lucioles; F-06921 Sophia-Antipolis, vol. RAN WG1, no. Sophia-Antipolis, France; Mar. 22, 2016-Mar. 24, 2016, Mar. 22, 2016, XP051081094, 9 pages, Retrieved from the Internet: URL: http://www.3gpp.org/ftp/tsg_ran/WG1_RL1/TSGR1_AH/LTE_NB-IoT_1603/Docs/ [retrieved on Mar. 22, 2016] section 3-5.
Partial International Search Report—PCT/US2019/030143—ISA/EPO—Jul. 1, 2019 (183224WO).

\* cited by examiner

RATE-MATCHING ACROSS DOWNLINK TRANSMISSION REPETITIONS IN WIRELESS COMMUNICATIONS

CROSS REFERENCES

The present application for patent claims the benefit of U.S. Provisional Patent Application No. 62/665,487 by HOSSEINI, et al., entitled "Rate-Matching Across Downlink Transmission Repetitions In Wireless Communications," filed May 1, 2018, and to U.S. Provisional Patent Application No. 62/670,518 by HOSSEINI, et al., entitled "Rate-Matching Across Downlink Transmission Repetitions In Wireless Communications," filed May 11, 2018, assigned to the assignee hereof, and expressly incorporated herein.

BACKGROUND

The following relates generally to wireless communications, and more specifically to rate-matching across downlink transmission repetitions in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems, a transmitting device (e.g., a base station or a UE) may be configured to transmit a transport block in a set of transmission time intervals (TTIs) of a repetition window to improve the chances that the transport block is received by a receiving device. For example, in some ultra-reliability low-latency communication (URLLC) modes, relatively stringent error rates and latency bounds may be established that may not allow for feedback (e.g., hybrid acknowledgment repeat request (HARD) feedback) that indicates successful or unsuccessful reception of a transmission and subsequent retransmission if needed. In such cases, a transmitting device may transmit two or more repetitions of a transmission to enhance the likelihood of successful receipt at the receiving device. In some cases, however, it may be challenging for the transmitting device and receiving device to identify appropriate configurations for transmitting and receiving the transport block within the repetition window.

SUMMARY

The described techniques relate to improved methods, systems, devices, and apparatuses that support rate-matching across downlink transmission repetitions in wireless communications. Various aspects of the described techniques provide for determining downlink control resources for providing control information to a user equipment (UE) that indicates downlink resources for a downlink transmission and a number of repetitions of the downlink transmission. The control information may be provided in a first transmission time interval (TTI), and the repetitions may span a plurality of TTIs. In some cases, the UE may rate-match a shared channel (e.g., physical downlink shared channel (PDSCH)) containing the downlink transmission around the downlink control resources of the first TTI, and also perform the same rate-matching in each subsequent TTI of the plurality of TTIs. In some cases, the UE may perform a first rate-matching in the first TTI based on a dynamic rate-matching indication, and perform rate-matching in each subsequent TTI based on the dynamically indicated rate-matching behavior assuming that the subsequent TTIs do not include downlink control information. In some cases, the rate-matching for each subsequent TTI may be configured, such as for rate-matching around an entire resource block or not rate-matching at all.

In some cases, one or more other sets of resources may be identified for other control information or reference signal transmissions (e.g., physical broadcast channel (PBCH) resources, a primary synchronization signal (PSS), a secondary synchronization signal (SSS), or combinations thereof. In such cases, the UE may also rate-match shared channel resources in each of the plurality of TTIs around the other control information or reference signal transmissions. The UE may demodulate and decode the rate-matched downlink shared channel transmissions transmitted across the plurality of TTIs. In some cases, the UE may combine each of the repetitions (e.g., through soft combining in a soft combining buffer) and demodulate and decode the downlink transmission based on the combined repetitions.

In some cases, the downlink control information may be repeated in two or more of the TTIs and a UE may identify uplink resources for transmitting uplink control information based on the downlink control information. In some cases, the uplink resources may be identified based on a number of TTIs following the end of the plurality of TTIs, and each repetition of the downlink control information may be adjusted to indicate a same ending TTI of the plurality of TTIs. In some cases, each repetition of the downlink control information may include the same information to allow for combining of the downlink control information, and the uplink resources may be explicitly identified each instance of the downlink control information, or may be implicitly determined based on one or more parameters of the downlink control information (e.g., a starting resource location).

A method of wireless communication at a UE is described. The method may include identifying a first set of control channel resources in a first TTI of a set of TTIs in which repetitions of a downlink shared channel transmission to the UE are transmitted, rate-matching each repetition of the downlink shared channel transmission in each of the plurality of TTIs based at least in part on the first set of control channel resources to identify shared channel resources in each of the plurality of TTIs, and receiving the downlink shared channel transmission via the shared channel resources in each of the set of TTIs.

An apparatus for wireless communication at a UE is described. The apparatus may include a processor, memory in electronic communication with the processor, and instructions stored in the memory. The instructions may be executable by the processor to cause the apparatus to identify a first set of control channel resources in a first TTI of a set of TTIs in which repetitions of a downlink shared channel transmission to the UE are transmitted, rate-match each repetition of the downlink shared channel transmission in each of the plurality of TTIs based at least in part on the first set of control channel resources to identify shared channel resources in each of the plurality of TTIs, and receive the downlink shared channel transmission via the shared channel resources in each of the set of TTIs.

Another apparatus for wireless communication at a UE is described. The apparatus may include means for identifying a first set of control channel resources in a first TTI of a set of TTIs in which repetitions of a downlink shared channel transmission to the UE are transmitted, rate-matching each repetition of the downlink shared channel transmission in each of the plurality of TTIs based at least in part on the first set of control channel resources to identify shared channel resources in each of the plurality of TTIs, and receiving the downlink shared channel transmission via the shared channel resources in each of the set of TTIs.

A non-transitory computer-readable medium storing code for wireless communication at a UE is described. The code may include instructions executable by a processor to identify a first set of control channel resources in a first TTI of a set of TTIs in which repetitions of a downlink shared channel transmission to the UE are transmitted, rate-match each repetition of the downlink shared channel transmission in each of the plurality of TTIs based at least in part on the first set of control channel resources to identify shared channel resources in each of the plurality of TTIs, and receive the downlink shared channel transmission via the shared channel resources in each of the set of TTIs.

In some examples of the method, apparatuses, and non-transitory computer-readable medium described herein, the first set of control channel resources includes a subset of a set of resources configurable for control channel transmissions, and where the shared channel resources in each of the set of TTIs include at least a portion of the set of resources configurable for control channel transmissions.

In some examples of the method, apparatuses, and non-transitory computer-readable medium described herein, the first set of control channel resources may be configured in first control information semi-statically or dynamically.

In some examples of the method, apparatuses, and non-transitory computer-readable medium described herein, the first set of control channel resources are configured dynamically in the first control information, and the rate-matching includes determining a rate-matching mode for the first set of control channel resources based at least on a dynamic indication field in the first control information, rate-matching the downlink shared channel transmission of the first TTI based at least in part on the determined rate-matching mode, and rate-matching each remaining TTI of the plurality of TTIs based at least in part on the rate-matching mode for the first set of control channel resources. In some cases, the dynamic indication field indicates rate-matching around only the first control information or rate-matching around an entire resource block (RB) set and whether such rate-matching is performed in the presence or absence of control information within the TTI, and the rate-matching each remaining TTI is performed according to the dynamic indication field and assuming that none of the remaining TTIs include control information. In some cases, the rate-matching each remaining TTI is performed according to a semi-static configuration to rate-match around an entire RB set or to not perform rate-matching in each remaining TTI after the first TTI. In some cases, the semi-static configuration is provided via radio resource control (RRC) signaling.

Some examples of the method, apparatuses, and non-transitory computer-readable medium described herein may further include operations, features, means, or instructions for receiving two or more instances of the first control information in two or more TTIs of the set of TTIs, where each of the two or more instances may be received via same control channel resources as the first set of control channel resources.

Some examples of the method, apparatuses, and non-transitory computer-readable medium described herein may further include operations, features, means, or instructions for identifying a second set of resources for transmission of one or more of a physical broadcast channel (PBCH), a PSS, and a SSS, and where the rate-matching further includes rate-matching one or more repetitions of the downlink shared channel transmission around the second set of resources.

In some examples of the method, apparatuses, and non-transitory computer-readable medium described herein, the rate-matching around the second set of resources may be performed for each TTI of the set of TTIs irrespective of whether one or more of the PBCH, PSS, or SSS may be scheduled in the TTI.

Some examples of the method, apparatuses, and non-transitory computer-readable medium described herein may further include operations, features, means, or instructions for demodulating one or more resource blocks (RBs) of the downlink shared channel transmission of a second TTI based on a demodulation reference signal (DMRS) scheduled in the first TTI, identifying that a DMRS occasion of at least a first RB collides with the second set of resources in the first TTI and rate-matching the downlink shared channel transmission of the second TTI around the first RB in the second TTI.

In some examples of the method, apparatuses, and non-transitory computer-readable medium described herein, the first control information indicates a number of repetitions of the downlink shared channel transmission.

A method of wireless communication at a base station is described. The method may include identifying a first set of control channel resources in a first TTI of a set of TTIs in which repetitions of a downlink shared channel transmission to a UE are transmitted, rate-matching each repetition of the downlink shared channel transmission in each of the plurality of TTIs based at least in part on the first set of control channel resources, and transmitting the repetitions of the downlink shared channel transmission in each of the set of TTIs.

An apparatus for wireless communication at a base station is described. The apparatus may include a processor, memory in electronic communication with the processor, and instructions stored in the memory. The instructions may be executable by the processor to cause the apparatus to identify a first set of control channel resources in a first TTI of a set of TTIs in which repetitions of a downlink shared channel transmission to a UE are transmitted, rate-match each repetition of the downlink shared channel transmission in each of the plurality of TTIs based at least in part on the first set of control channel resources, and transmit the repetitions of the downlink shared channel transmission in each of the set of TTIs.

Another apparatus for wireless communication at a base station is described. The apparatus may include means for identifying a first set of control channel resources in a first TTI of a set of TTIs in which repetitions of a downlink shared channel transmission to a UE are transmitted, rate-matching each repetition of the downlink shared channel transmission in each of the plurality of TTIs based at least in part on the first set of control channel resources, and transmitting the repetitions of the downlink shared channel transmission in each of the set of TTIs.

A non-transitory computer-readable medium storing code for wireless communication at a base station is described. The code may include instructions executable by a processor to identify a first set of control channel resources in a first TTI of a set of TTIs in which repetitions of a downlink shared channel transmission to a UE are transmitted, rate-matching each repetition of the downlink shared channel transmission in each of the plurality of TTIs based at least in part on the first set of control channel resources, and transmit the repetitions of the downlink shared channel transmission in each of the set of TTIs.

In some examples of the method, apparatuses, and non-transitory computer-readable medium described herein, the first set of control channel resources includes a subset of a set of resources configurable for control channel transmissions, and where shared channel resources in each of the set of TTIs for the downlink shared channel transmissions include at least a portion of the set of resources configurable for control channel transmissions.

In some examples of the method, apparatuses, and non-transitory computer-readable medium described herein, the first set of control channel resources may be configured in the first control information semi-statically or dynamically.

In some examples of the method, apparatuses, and non-transitory computer-readable medium described herein, the first set of control channel resources are configured dynamically in the first control information, and the rate-matching includes dynamically determining a rate-matching mode for the first set of control channel resources, setting a dynamic indication field in the first control information to indicate the rate-matching mode to the UE, rate-matching the downlink shared channel transmission of the first TTI based at least in part on the determined rate-matching mode, and rate-matching each remaining TTI of the plurality of TTIs based at least in part on the rate-matching mode for the first set of control channel resources. In some cases, the dynamic indication field indicates rate-matching around only the first control information or rate-matching around an entire RB set and whether such rate-matching is performed in the presence or absence of control information within the TTI, and wherein the rate-matching each remaining TTI is performed according to the dynamic indication field and assuming that none of the remaining TTIs include control information.

Some examples of the method, apparatuses, and non-transitory computer-readable medium described herein may further include operations, features, means, or instructions for providing a semi-static configuration to the UE to rate-match around an entire RB set or to not perform rate-matching in each remaining TTI after the first TTI. In some cases, the semi-static configuration is provided via RRC signaling.

Some examples of the method, apparatuses, and non-transitory computer-readable medium described herein may further include operations, features, means, or instructions for transmitting two or more instances of the first control information in two or more TTIs of the set of TTIs, where each of the two or more instances may be transmitted via same control channel resources as the first set of control channel resources.

Some examples of the method, apparatuses, and non-transitory computer-readable medium described herein may further include operations, features, means, or instructions for identifying a second set of resources for transmission of one or more of a physical broadcast channel (PBCH), a PSS, and a SSS, and where the rate-matching further includes rate-matching one or more repetitions of the downlink shared channel transmission around the second set of resources.

In some examples of the method, apparatuses, and non-transitory computer-readable medium described herein, the rate-matching around the second set of resources may be performed for each TTI of the set of TTIs irrespective of whether one or more of the PBCH, PSS, or SSS may be scheduled in the TTI.

In some examples of the method, apparatuses, and non-transitory computer-readable medium described herein, the first control information indicates a number of repetitions of the downlink shared channel transmission.

A method of wireless communication at a UE is described. The method may include receiving a set of repetitions of DCI in a set of transmission time intervals (TTIs), decoding at least a first instance of the DCI received in at least a first TTI of the set of TTIs, and identifying uplink resources for acknowledging receipt of transmissions in all of the set of TTIs based on the first instance of the DCI.

An apparatus for wireless communication at a UE is described. The apparatus may include a processor, memory in electronic communication with the processor, and instructions stored in the memory. The instructions may be executable by the processor to cause the apparatus to receive a set of repetitions of DCI in a set of transmission time intervals (TTIs), decode at least a first instance of the DCI received in at least a first TTI of the set of TTIs, and identify uplink resources for acknowledging receipt of transmissions in all of the set of TTIs based on the first instance of the DCI.

Another apparatus for wireless communication at a UE is described. The apparatus may include means for receiving a set of repetitions of DCI in a set of transmission time intervals (TTIs), decoding at least a first instance of the DCI received in at least a first TTI of the set of TTIs, and identifying uplink resources for acknowledging receipt of transmissions in all of the set of TTIs based on the first instance of the DCI.

A non-transitory computer-readable medium storing code for wireless communication at a UE is described. The code may include instructions executable by a processor to receive a set of repetitions of DCI in a set of transmission time intervals (TTIs), decode at least a first instance of the DCI received in at least a first TTI of the set of TTIs, and identify uplink resources for acknowledging receipt of transmissions in all of the set of TTIs based on the first instance of the DCI.

In some examples of the method, apparatuses, and non-transitory computer-readable medium described herein, the DCI indicates a number of repetitions of downlink shared channel transmission.

In some examples of the method, apparatuses, and non-transitory computer-readable medium described herein, each repetition of the DCI includes an index indicating a location of the uplink resources relative to a TTI of the set of TTIs containing the DCI, and where the index of each subsequent repetition of the DCI may be adjusted to indicate a same location of the uplink resources.

In some examples of the method, apparatuses, and non-transitory computer-readable medium described herein, a location of the uplink resources may be determined based on a first decoded instance of the DCI, and where one or more subsequent instances of the DCI may be ignored.

In some examples of the method, apparatuses, and non-transitory computer-readable medium described herein, the decoding further may include operations, features, means, or instructions for combining multiple instances of the DCI, and where the uplink resources may be further identified based on the combined DCI.

In some examples of the method, apparatuses, and non-transitory computer-readable medium described herein, the DCI includes an explicit indication of the uplink resources.

In some examples of the method, apparatuses, and non-transitory computer-readable medium described herein, the DCI includes an implicit indication of uplink resources based on index of a starting control channel element (CCE) of the DCI.

In some examples of the method, apparatuses, and non-transitory computer-readable medium described herein, the starting CCE of the DCI may be a same CCE for each of the set of repetitions of the DCI.

In some examples of the method, apparatuses, and non-transitory computer-readable medium described herein, the starting CCE of the DCI may be a different CCE for at least one of the set of repetitions of the DCI, and where the implicit indication of the uplink resources may be based on an index of the starting CCE of a first instance of the DCI.

A method of wireless communication at a base station is described. The method may include identifying a set of transmission time intervals (TTIs) for transmission of a set of repetitions of DCI to a UE, formatting at least a first instance of the DCI to indicate uplink resources allocated for the UE to acknowledge receipt of transmissions in all of the set of TTIs, and transmitting the set of repetitions of DCI to the UE in at least a subset of the set of transmission time intervals (TTIs).

An apparatus for wireless communication at a base station is described. The apparatus may include a processor, memory in electronic communication with the processor, and instructions stored in the memory. The instructions may be executable by the processor to cause the apparatus to identify a set of transmission time intervals (TTIs) for transmission of a set of repetitions of DCI to a UE, format at least a first instance of the DCI to indicate uplink resources allocated for the UE to acknowledge receipt of transmissions in all of the set of TTIs, and transmit the set of repetitions of DCI to the UE in at least a subset of the set of transmission time intervals (TTIs).

Another apparatus for wireless communication at a base station is described. The apparatus may include means for identifying a set of transmission time intervals (TTIs) for transmission of a set of repetitions of DCI to a UE, formatting at least a first instance of the DCI to indicate uplink resources allocated for the UE to acknowledge receipt of transmissions in all of the set of TTIs, and transmitting the set of repetitions of DCI to the UE in at least a subset of the set of transmission time intervals (TTIs).

A non-transitory computer-readable medium storing code for wireless communication at a base station is described. The code may include instructions executable by a processor to identify a set of transmission time intervals (TTIs) for transmission of a set of repetitions of DCI to a UE, format at least a first instance of the DCI to indicate uplink resources allocated for the UE to acknowledge receipt of transmissions in all of the set of TTIs, and transmit the set of repetitions of DCI to the UE in at least a subset of the set of transmission time intervals (TTIs).

In some examples of the method, apparatuses, and non-transitory computer-readable medium described herein, the DCI indicates a number of TTIs of the set of TTIs.

In some examples of the method, apparatuses, and non-transitory computer-readable medium described herein, each repetition of the DCI includes an index indicating a location of the uplink resources relative to a TTI of the set of TTIs containing the DCI, and where the index of each subsequent repetition of the DCI may be adjusted to indicate a same location of the uplink resources.

In some examples of the method, apparatuses, and non-transitory computer-readable medium described herein, a location of the uplink resources may be determined based on a first decoded instance of the DCI, and where one or more subsequent instances of the DCI may be ignored.

Some examples of the method, apparatuses, and non-transitory computer-readable medium described herein may further include operations, features, means, or instructions for multiple instances of the DCI may be combined at the UE, and where the multiple instances of the DCI include identical information.

In some examples of the method, apparatuses, and non-transitory computer-readable medium described herein, the DCI includes an explicit indication of the uplink resources.

In some examples of the method, apparatuses, and non-transitory computer-readable medium described herein, the DCI includes an implicit indication of uplink resources based on index of a starting control channel element (CCE) of the DCI.

In some examples of the method, apparatuses, and non-transitory computer-readable medium described herein, the starting CCE of the DCI may be a same CCE for each of the set of repetitions of the DCI.

In some examples of the method, apparatuses, and non-transitory computer-readable medium described herein, the starting CCE of the DCI may be a different CCE for at least one of the set of repetitions of the DCI, and where the implicit indication of the uplink resources may be based on an index of the starting CCE of a first instance of the DCI.

DETAILED DESCRIPTION

Figure 1:
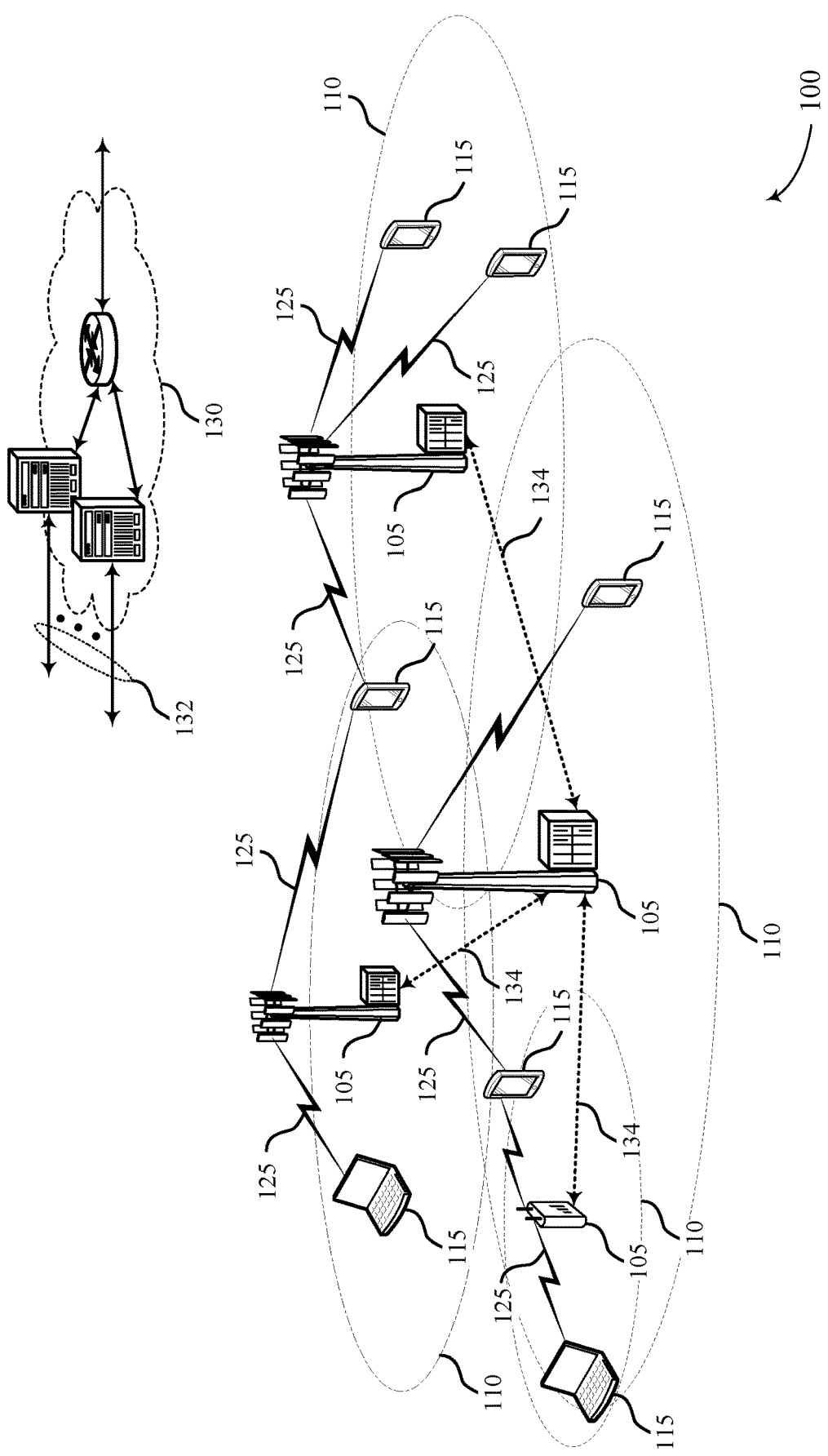
FIG. 1 illustrates an example of a system for wireless communications that supports rate-matching across downlink transmission repetitions in wireless communications in accordance with aspects of the present disclosure.

Some wireless communications systems may support repetition-based transmissions of a transport block in a repetition window to increase the chances that the transport block is received by a receiving device. As described herein, a wireless communications system may support efficient techniques for limiting the latency and increasing the reliability associated with repetition-based transmissions. In particular, when a transmitting device, such as a base station or a user equipment (UE), identifies a repetition window for a transmission that includes a plurality of transmission time intervals (TTIs), each instance of a repeated transmission in each of the TTIs may be rate-matched around one or more sets of control resources that may be present in one or more of the TTIs according to a semi-static control resource and rate-matching configuration. Such techniques may provide each instance of a repeated transmission to be transmitted using the same resources within each TTI, which may facilitate enhanced reception at a receiving device (e.g., through combining of multiple instances of the repeated transmission). For example, in some ultra-reliability low-latency communication (URLLC) modes, relatively stringent error rates (e.g., a block error rate (BLER) of less than $10^{-5}$) and latency bounds (e.g., a latency bound of 1 ms) may be established that may not allow for feedback (e.g., hybrid acknowledgment repeat request (HARD) feedback) that and subsequent retransmission to occur within the latency bounds. In such cases, a transmitting device may utilize two or more repetitions according to techniques provided herein to enhance the likelihood of successful receipt at the receiving device.

In some cases, the UE may perform a first rate-matching in the first TTI based on a dynamic rate-matching indication, and perform rate-matching in each subsequent TTI based on the dynamically indicated rate-matching behavior assuming that the subsequent TTIs do not include downlink control information. In some cases, rate-matching behavior for the subsequent TTIs may be configured at the UE, such as in a semi-static configuration provided via RRC signaling.

In some cases a base station may determine that a downlink transmission to a UE is to be repeated across a number of TTIs. The base station may identify downlink control resources for providing downlink control information (DCI) to the UE that indicates the downlink control resources and downlink shared channel resources within a first TTI of the number of TTIs. In some cases, the DCI may also indicate a number of repetitions, although in other cases the number of repetitions may be indicated via other signaling (e.g., one or more other parameters such as a modulation and coding scheme (MCS), a resource block (RB) allocation, a redundancy version (RV), or combinations thereof). The control information and a first instance of the downlink transmission may be provided in a first TTI, and the repetitions may span one or more subsequent TTIs of the number of TTIs. In some cases, the UE may rate-match a shared channel (e.g., physical downlink shared channel (PDSCH)) containing the downlink transmission around the downlink control resources of the first TTI, and also perform the same rate-matching in each subsequent TTI of the number of TTIs. In some cases, the rate-matching behavior remains the same and the UE follows a command provided in the first DCI. In some cases, such rate-matching may be around any transmissions or signals that may overlap with the shared channel transmission (e.g., PBCH/PSS/SSS, or other parts or signals).

In some cases, one or more other sets of resources may be identified for other control information or reference signal transmissions (e.g., physical broadcast channel (PBCH) resources, a primary synchronization signal (PSS), a secondary synchronization signal (SSS, or combinations thereof). In such cases, the UE may also rate-match shared channel resources in each of the number of TTIs around the other control information or reference signal transmissions. The UE may demodulate and decode the rate-matched downlink shared channel transmissions transmitted across the number of TTIs. In some cases, the UE may combine each of the repetitions (e.g., through soft combining in a soft combining buffer) and demodulate and decode the downlink transmission based on the combined repetitions.

In some cases, the downlink control information may be repeated in two or more of the TTIs and a UE may identify uplink resources for transmitting uplink control information based on the downlink control information. In some cases, the uplink resources may be identified based on a number of TTIs following the end of the plurality of TTIs, and each repetition of the downlink control information may be adjusted to indicate a same ending TTI of the plurality of TTIs. In some cases, each repetition of the downlink control information may include the same information to allow for combining of the downlink control information, and the uplink resources may be explicitly identified each instance of the downlink control information, or may be implicitly determined based on one or more parameters of the downlink control information (e.g., a starting resource location).

As a result, the chances that the downlink transmission is received by a UE may be increased since the transmitting base station may transmit multiple repetitions of the downlink transmission. Such increased likelihood of successful reception may enhance reliability of a system, and reduce overall latency of the system.

Aspects of the disclosure are initially described in the context of a wireless communications system. Various examples of TTIs in a repetition window and associated resources for downlink and uplink transmissions are also described. Aspects of the disclosure are further illustrated by and described with reference to apparatus diagrams, system diagrams, and flowcharts that relate to rate-matching across downlink transmission repetitions in wireless communications.

FIG. 1 illustrates an example of a wireless communications system 100 that supports rate-matching across downlink transmission repetitions in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 and UEs 115 may use repetitions of transmissions within a repetition window to enhance the likelihood of successful reception in accordance with various techniques discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods.

In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs). In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105. The term TTI is used herein to interchangeably refer to any duration scheduling unit of the wireless communications system 100.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, a base station 105 may determine downlink control resources for providing DCI to a UE 115. Such DCI may indicate downlink resources for a downlink shared channel transmission (e.g., PDSCH), and in some cases, a number of repetitions of the downlink transmission. The DCI may be provided in a first TTI, and the repetitions may span a plurality of TTIs. In some cases, the UE 115 may rate-match the shared channel transmission around the downlink control resources of the first TTI, and also perform the same rate-matching in each subsequent TTI of the plurality of TTIs. In some cases, the DCI may be repeated in two or more of the TTIs and the UE 115 may identify uplink resources for transmitting uplink control information based on the downlink control information. In some cases, the uplink resources may be identified based on a number of TTIs following the end of the plurality of TTIs, and each repetition of the downlink control information may be adjusted to indicate a same ending TTI of the plurality of TTIs.

Figure 2:
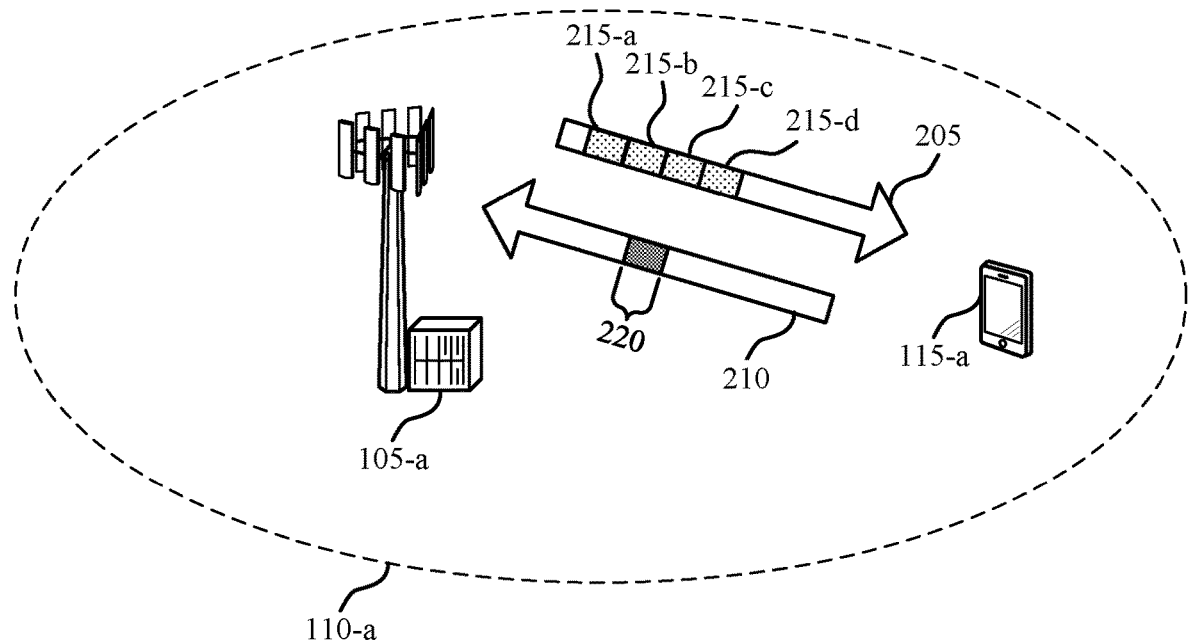
FIG. 2 illustrates an example of a portion of a wireless communications system that supports rate-matching across downlink transmission repetitions in wireless communications in accordance with aspects of the present disclosure.

FIG. 2 illustrates an example of a portion of a wireless communications system 200 that supports rate-matching across downlink transmission repetitions in wireless communications in accordance with aspects of the present disclosure. In some examples, wireless communications system 200 may implement aspects of wireless communications system 100. In some examples, the wireless communications system 200 may include a base station 105-a and UE 115-a, which may be examples of the corresponding devices as described with reference to FIG. 1. UE 115-a may communicate with the base station 105-a within a coverage area 110-a.

In some examples, the base station 105-a may transmit downlink transmissions 205 to the UE 115-a, and UE 115-a may transmit uplink transmissions 210 to the base station. The downlink transmissions 205 and uplink transmissions 210 may be made via one or more carriers. As indicated above, the base station 105-a may configure resources for various uplink and downlink transmissions, including physical downlink control channel (PDCCH) transmissions, physical downlink shared channel (PDSCH) transmissions, physical uplink control channel (PUCCH), physical uplink shared channel (PUSCH), and physical random access channel (PRACH) resources, among others. In some cases, the base station 105-a may configure repetitions of downlink transmissions, and in the example of FIG. 2, four instances of downlink transmission repetitions 215 may be transmitted from the base station 105-a to the UE 115-a. While four repetitions are illustrated and discussed in various examples herein, different numbers of transmission repetitions may be present in various cases. In this example, an initial downlink transmission repetition 215-a may be followed by subsequent downlink transmission repetitions 215-b, 215-c, and 215-d in a repetition window that may include four TTIs (e.g., four subframes, four slots, four mini-slots, etc.). The repetitions may include repeated PDSCH transmissions, repeated PDCCH transmissions, or any combinations thereof. In some examples, the downlink transmissions 215 may be URLLC transmissions, which may have relatively strict reliability and latency targets.

As indicated above, one technique to help achieve the relatively stringent reliability and latency targets is to provide for repetition-based transmissions. In the example of FIG. 2, the downlink transmission repetitions 215 may include repetitions of a PDSCH transmission in which a same transport block (TB) can be transmitted K times over K downlink TTIs, where K equals four in this example. The transmissions within the repetition window are not triggered by HARQ feedback. In some cases, the base station may transmit DCI including a field indicating the total number of transmissions. Once the UE 115-a detects the DCI, it expects to receive K PDSCHs over K TTIs over the resources indicated by the DCI. Additionally or alternatively, in some cases to help enhance the PDCCH reliability, the base station 105-a may transmit a scheduling DCI for a given TB multiple times over multiple resources. In some cases with DCI repetition, once the UE 115-a detects one DCI, it may ignore other DCIs within the repetition window scheduling the TB over the same TTI length. In other cases, DCI repetition may be used with combining to help increase PDCCH reliability. In some cases, the UE 115-a may be configured with a number of repetitions (K) and some other parameters such as MCS/RB allocation/RV/etc., that may be used to indicate repetitions in downlink transmissions, and a DCI may activate the repetition-based PDSCH transmission based on a value of one or more of the parameters.

In some cases, rate-matching may be implemented to identify PDSCH resources and PDCCH resources in each of the downlink transmission repetitions 215. In some deployments, the base station 105-a may configure certain resources that are configurable to transmit control information, such as a RB set or CORESET. Rate-matching may allow, in some cases, PDSCH transmissions using portions of the RB set or CORESET resources that are not used for DCI. In some cases, rate-matching may be indicated semi-statically or dynamically, and may include a number of modes. In one mode, rate-matching is provided only around the DCI scheduling the PDSCH if transmitted in the PDCCH RB-set, otherwise no rate-matching is performed for the RB set. In a second mode, the UE 115-a may rate-match around the entire PDCCH RB set (or CORESET). In a third mode, the UE 115-a may rate-match around the entire PDCCH RB set/CORESET if the DCI scheduling the PDSCH is found in the RB set/CORESET, otherwise no rate-matching is performed for the RB set/CORESET. In a fourth mode, the UE may rate-match around the entire PDCCH RB set if the DCI scheduling the PDSCH is not found in the RB-set/CORE-SET, otherwise the UE 115-a may rate-match only around the DCI scheduling the PDSCH (if transmitted in the PDCCH RB-set). In some cases, when dynamic indication is enabled, an information field within the DCI indicates which resources are used/not used for PDSCH if the PDSCH assignment and RB set/CORESET are overlapping. In some further cases, as will be discussed in more detail below, the PDSCH assignment in one TTI may also collide with other signals such as PBCH/PSS/SSS/etc.

In some cases, when repetition-based PDSCH transmission is enabled, the base station 105-a and UE 115-a may perform rate-matching across each TTI in the repetition window. For example, one single DCI in the first downlink transmission repetition 215-a may trigger the repetition-based transmission. The location of this DCI within an RB set/CORESET and the configured mode of operation for the given RB set/CORESET may then determine how the PDSCH should be rate-matched across the number of TTIs in the repetition window. In some cases, the UE may ignore any PDCCH transmissions in subsequent downlink repetitions 215-b, 215-c, and 215-d, or even avoid monitoring PDCCH in the subsequent TTIs that include the subsequent downlink repetitions 215-b, 215-c, and 215-d, or any subsequent TTI following a detected PDCCH transmission. As indicated above, in some cases, a same rate-matching of PDSCH around PDCCH transmissions in a first downlink repetition 215-a may be used in each subsequent downlink repetition 215-b, 215-c, and 215-d, and example of which is discussed with respect to FIG. 3.

Figure 3:
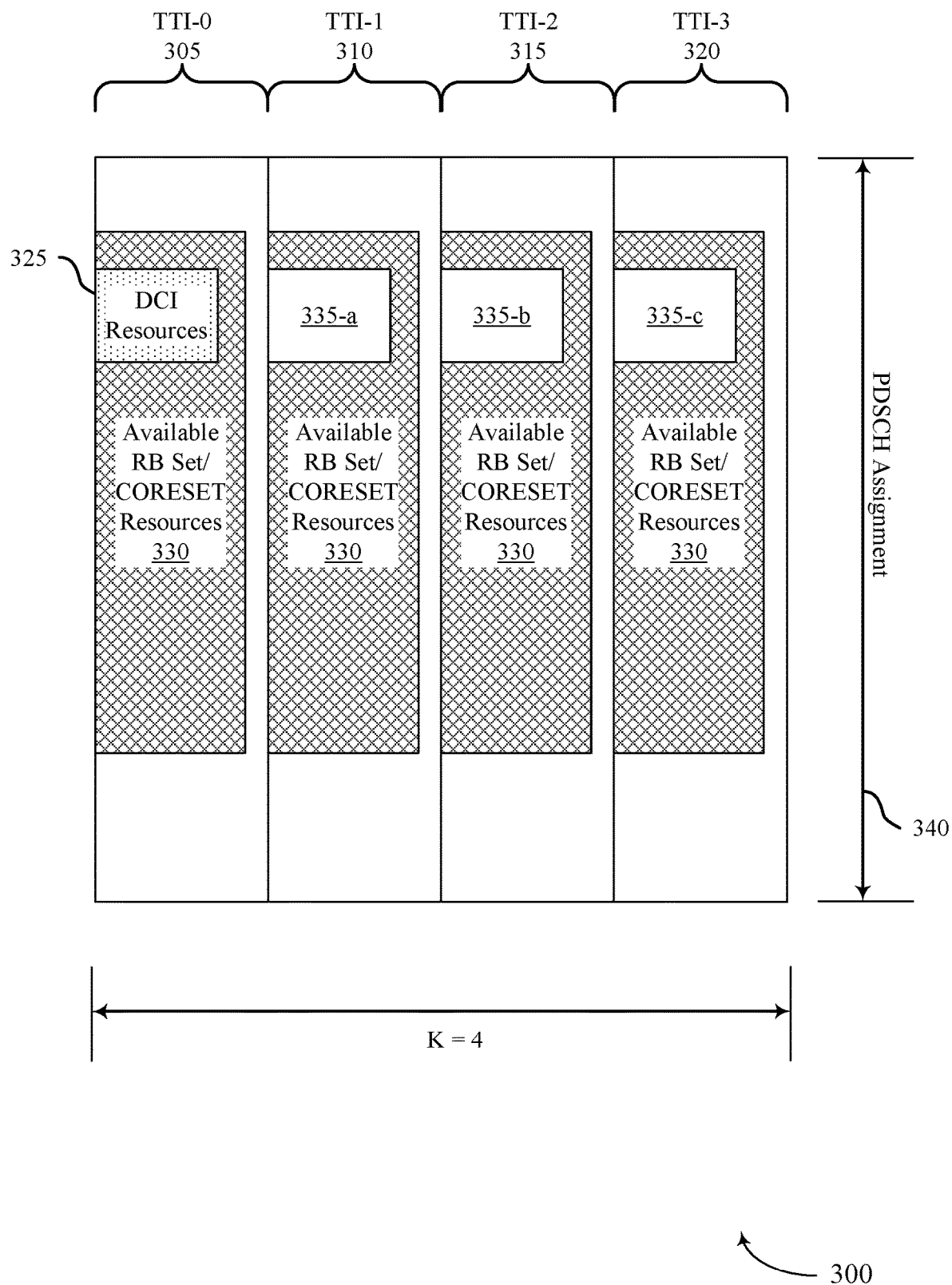
FIG. 3 illustrates an example of a repetition window that supports rate-matching across downlink transmission repetitions in wireless communications in accordance with aspects of the present disclosure.

FIG. 3 illustrates an example of a repetition window 300 that supports rate-matching across downlink transmission repetitions in wireless communications in accordance with aspects of the present disclosure. In some examples, repetition window 300 may implement aspects of wireless communications system 100 or 200. In this example, repetition window 300 may include four TTIs (i.e., K=4), which include a first TTI (TTI-0) 305, a second TTI (TTI-1) 310, a third TTI (TTI-2) 315, and a fourth TTI (TTI-3) 320. In this example, the rate-matching mode configured for an RB set/CORESET is that if DCI is found in the RB set, the PDSCH should only be rate-matched around the scheduling DCI. In this case, the scheduling DCI may be transmitted via DCI resources 325.

In some cases, the RB sets/CORESETs 330 may be configured semi-statically, and span over the same resources in other TTIs 310-320 within the repetition window 300. The PDSCH assignment 340 in all TTIs 305-320 within the repetition window 300 may also be given once (e.g., either explicitly by the first DCI or activated by the first DCI). Thus, from the UE perspective, the rate-matching assumption does not subsequent TTIs 310-320 after the first TTI 305 within the repetition window 300. According to various aspects of the disclosure, the UE may apply the same rule regardless of the configured mode for the RB set/CORESET. Thus, the UE may receive the rate-matching command once in the first TTI 305, and follow the same behavior in the subsequent TTIs 310-320. Additionally, the UE may apply the same rule across each TTI 305-320 in the repetition window 300 when dynamic or semi-static indication is used. Thus, the resources within the RB set/CORESET 330 indicated by the DCI to be used for PDSCH mapping in the first TTI 305 will be used for PDSCH mapping in the subsequent TTIs 310-320. Thus, in such cases, regardless of the semi-static or dynamic rate-matching behavior implied in the first TTI 305, the UE is expected to receive the PDSCH in the subsequent TTIs 310-320 over the same resources where PDSCH were mapped to in the first TTI 305.

As mentioned above, in some cases to increase PDCCH reliability a base station may transmit the DCI scheduling the same TB multiple times, which will be discussed in further detail below. However, the base station may not know which transmitted DCI will be detected by the UE. In some cases, based on the above rate-matching behavior within the repetition window 300, if the base station transmits other DCIs in the subsequent TTIs 310-320 over the same RB set/CORESET 330 used for transmission of the first DCI in the first TTI 305, the other DCI may be allocated resources that match the DCI resources 325, and would thus be included in the resources 335 that are rate-matched around in the subsequent TTIs 310-320. In some cases, the base station may avoid transmitting other DCIs via another RB set/CORESET other than RB set/CORESET 330 during the repetition window, because if the UE detects such DCI it may be assumed to be present in both sets of resources and the rate-matching would change accordingly which may negatively impact decoding performance for the PDSCH assignment 340. In some cases, a base station may determine that one or more other DCI transmissions are to puncture the PDSCH resources of one or more of the TTIs 305-320. For example, if the base station determines that a coding rate of the PDSCH assignment 340 is relatively low and a relatively high priority DCI is to be transmitted, the base station may determine that the UE is still likely to be able to decode the PDSCH transmission and may puncture a portion of the PDSCH assignment 340 in one (or more) of the TTIs 305-320.

In some cases, the RB sets/CORESETs 330 may be configured dynamically within the repetition window 300. In such cases, rate-matching behavior may be defined based on whether the dynamic or the semi-static behavior is used over the first TTI 305 of the repetition window 300. In some cases, if one semi-static rate-matching mode is used over the first TTI, the rate-matching behavior remains the same in the remaining TTIs 310-320. For example, RB set/CORESET 330 may have a rate-matching mode that provides that rate-matching is performed only around DCI resources 325 if these resources are detected. Further, in some cases, one or more other RB sets may be present in the first TTI 305, which may have a different rate-matching mode (e.g., rate-matching around the entire RB set). For example, a second RB set may be present and the UE may rate-match around the entire second RB set. Thus, in such an example, the UE may rate-match around the DCI resource 325 of the RB set/CORESET 330, and around the entire second RB set in the first TTI 305. Further, this rate-matching behavior may remain the same for the remaining TTIs 310-320, as discussed above. In such cases, PDSCH transmissions may not be mapped to the RBs in other TTIs of the repetition window 300 where PDSCH was not mapped in the first TTI (e.g., if RB 0 is rate-matched around in the first TTI 305, it will be rate-matched around in other TTIs 310-320).

In examples where the rate-matching in the first TTI 305 is indicated dynamically (e.g., via a 2-bit indication field in the DCI), such a behavior may not be applicable to other TTIs 310-320 in the repetition window. In some cases, when a dynamic indication is provided, the UE may ignore the DCI in the remaining TTIs, and it can be assumed that no DCI is found. In some examples, a first rate-matching mode may provide that the UE rate-matches only around the DCI scheduling the PDSCH if transmitted in the PDCCH RB-set, and otherwise no rate-matching is performed for the RB set. In such examples, a second rate-matching mode may provide that the UE rate-matches around the whole PDCCH RB set. Further, a third rate-matching mode may provide that the UE rate-matches around the whole PDCCH RB set if DCI scheduling the PDSCH is found in the RB-set, otherwise no rate-matching is performed for the RB set. Additionally, a fourth rate-matching mode may provide that the UE rate-matches around the whole PDCCH RB set if DCI scheduling the PDSCH is not found in the RB-set, otherwise UE rate-matches only around the DCI scheduling the PDSCH, if transmitted in the PDCCH RB-set. Thus, the 2-bit indication field may indicate which rate-matching behavior applies for a TTI.

As indicated above, in some cases a dynamic indication may be provided in the first TTI 305, and the UE may assume that DCI is not provided in the remaining TTIs 310-320 within the repetition window. Thus, the four rate-matching modes, under the assumption that the subsequent TTIs 310-320 do not include DCI, provide two rate-matching behaviors, namely rate-matching around the entire RB set, or no rate-matching around the RB set. In some cases, the UE may be configured to either rate-match or not rate-match around the RB sets in the other TTIs 310-320, and such a configuration may be provided semi-statically by RRC signaling. As indicated above, in some cases, rate-matching may be performed on other downlink transmissions within a repetition window 300, such as PBCH/PSS/SSS transmissions, as will be discussed with reference to the example of FIG. 4.

Figure 4:
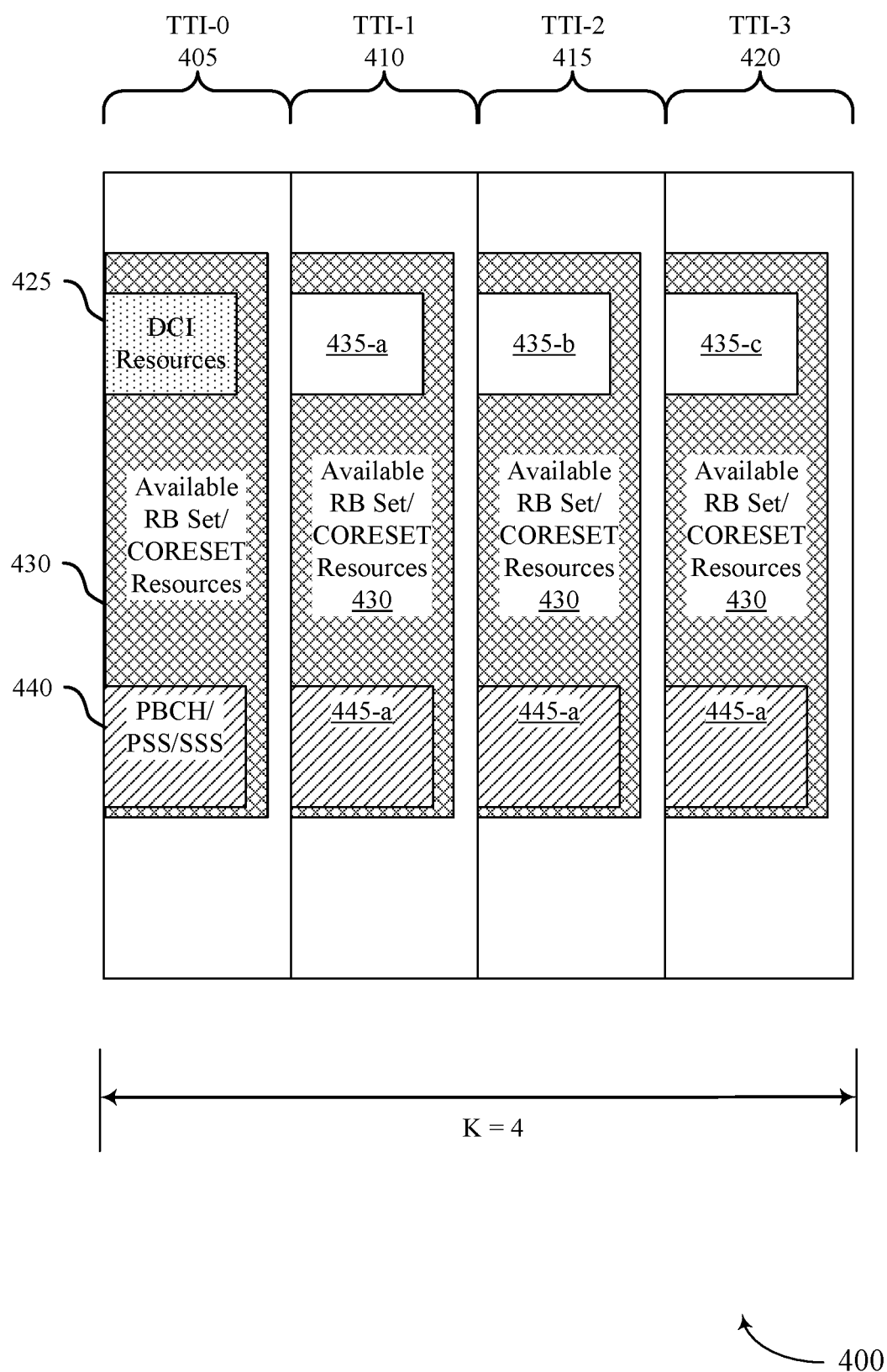
FIG. 4 illustrates an example of a repetition window with multiple sets of control resources that supports rate-matching across downlink transmission repetitions in wireless communications in accordance with aspects of the present disclosure.

FIG. 4 illustrates an example of a repetition window 400 with multiple sets of control resources that supports rate-matching across downlink transmission repetitions in wireless communications in accordance with aspects of the present disclosure. In some examples, repetition window 400 may implement aspects of wireless communications system 100 or 200. In this example, similarly as the example of FIG. 3, repetition window 400 may include four TTIs (i.e., K=4), which include a first TTI (TTI-0) 405, a second TTI (TTI-1) 410, a third TTI (TTI-2) 415, and a fourth TTI (TTI-3) 420. In this case, the scheduling DCI may be transmitted via DCI resources 425 in first TTI 405, and PBCH/PSS/SSS resources 440 may also be configured within the first TTI 405. Thus, the PDSCH assignment indicated for a given TB over the TTIs 405-420 of repetition window 400 collides with PBCH/PSS/SSS resources 440 in a subset of the TTIs 405-420.

In cases where such collision occurs when repetition is not enabled, the overlapping resources are not used for PDSCH mapping, and from the UE perspective the UE rate-matches its PDSCH around the colliding resources. When repetition is enabled, in some cases, PDSCH may not be mapped to the colliding resources only in the TTIs where collision happens (e.g., only in the first TTI 405 in the example of FIG. 4). The UE may thus rate-match PDSCH over the colliding resources 440, and the corresponding resources 445 in the subsequent TTIs 410-420 may be used for PDSCH transmissions. In other cases, if the PDSCH assignment collides with PBCH/PSS/SSS resources 440 in at least one TTI within the repetition window 400, the PDSCH is not mapped to the colliding RBs in any of the other TTIs within the repetition window 400 (e.g., PDSCH is also rate-matched around resources 445 in TTIs 410-420). In addition, for collision handling between the repetition window and PBCH/PSS/SSS, the rule could be dependent on the reference signal used for demodulation of the data. For example, if a DMRS-based transmit mode is used, then the UE and base station may rate-match around the colliding RBs in each TTI within the repetition window 400. But, when a cell-specific reference signal (CRS)-based transmit mode is used for PDSCH, then rate-matching of the PDSCH may only be around the colliding resources in the TTI where the collision happens. In some cases, rate-matching around the colliding RBs in each of the TTIs 405-420 within the repetition window 400 may be selected in cases where DMRS sharing is implemented, as will be discussed with respect to the example of FIG. 5.

Figure 5:
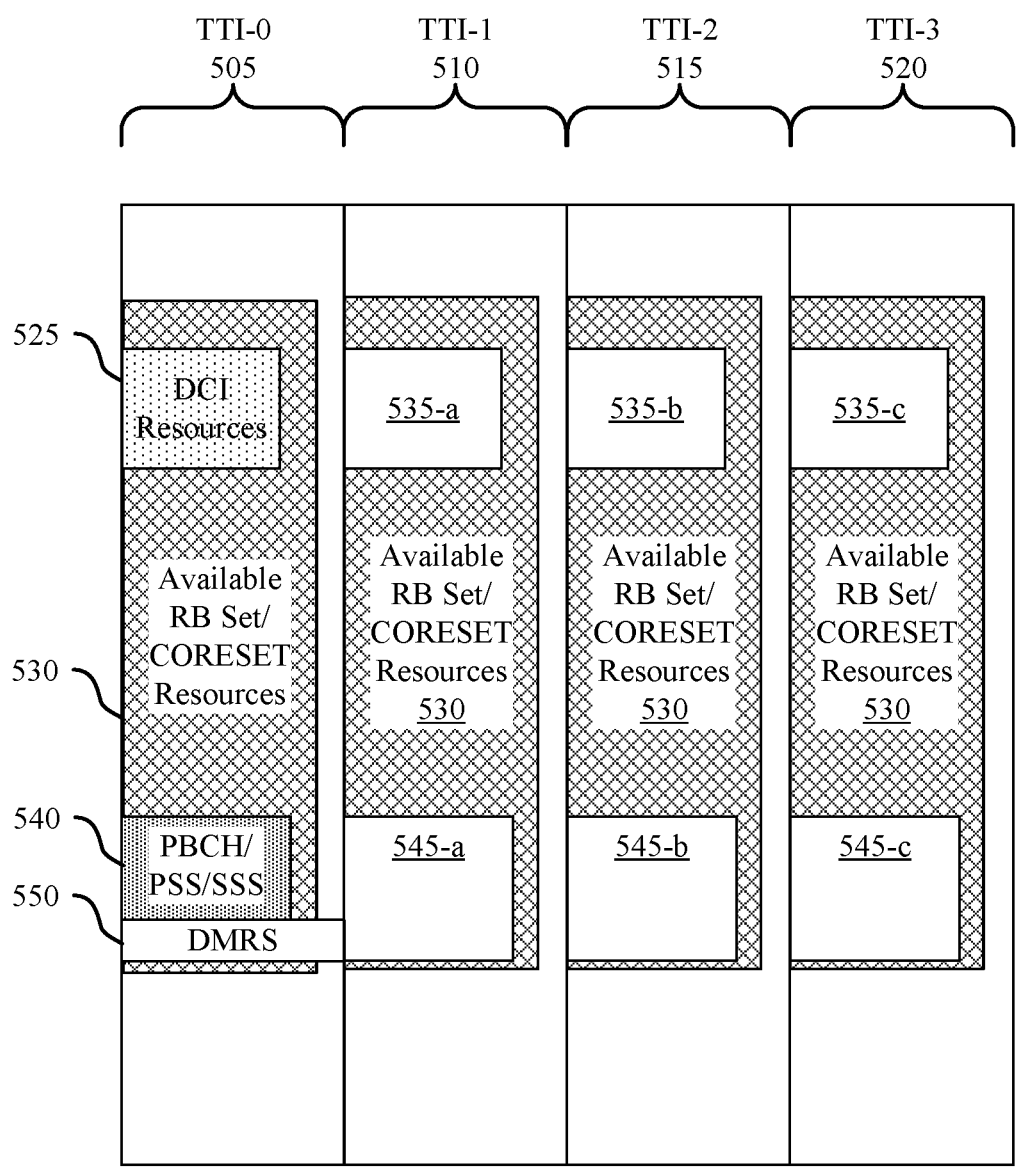
FIG. 5 illustrates an example of a repetition window with shared DMRS resources that supports rate-matching across downlink transmission repetitions in wireless communications in accordance with aspects of the present disclosure.

FIG. 5 illustrates an example of a repetition window 500 with shared DMRS resources that supports rate-matching across downlink transmission repetitions in wireless communications in accordance with aspects of the present disclosure. In some examples, repetition window 500 may implement aspects of wireless communications system 100 or 200. In this example, similarly as the example of FIGS. 3 and 4, repetition window 500 may include four TTIs (i.e., K=4), which include a first TTI (TTI-0) 505, a second TTI (TTI-1) 510, a third TTI (TTI-2) 515, and a fourth TTI (TTI-3) 520. In this case, the scheduling DCI may be transmitted via DCI resources 525 in first TTI 505, and PBCH/PSS/SSS resources 540 may also be configured within the first TTI 505. Thus, the PDSCH assignment indicated for a given TB over the TTIs 505-520 of repetition window 500 collides with PBCH/PSS/SSS resources 540 in a subset of the TTIs 505-520. Further, a shared DMRS 550 may be used in which DMRS 550 transmitted in the first TTI 505 may be used for demodulation of an associated RB in each of the first TTI 505 and the second TTI 510.

In this case, the shared DMRS 550 may collide with the PBCH/PSS/SSS resources 540 in the first TTI 505, and thus the DMRS 550 may not be transmitted. In such a case, the corresponding RB in the second TTI 510 may not be able to be demodulated in the absence of the DMRS 550. Thus, in such cases, rate-matching around the PBCH/PSS/SSS resources 540 and the corresponding resources 545 in the subsequent TTIs 510-520 may be implemented. In some cases, where DMRS sharing is enabled, when DMRS is present over the one of the TTIs 505-520, prior TTIs should not rely on the DMRS over future TTIs, which may not be transmitted; otherwise, the processing timeline will be impacted. In some cases, multiple TTIs 505-520 may have a DMRS configured (e.g., TTI-0 and TTI-2 may have DMRS, TTI-1 may reuse DMRS from TTI-0 and TTI-3 may reuse DMRS from TTI2), and if one of the DMRS occasions collides with PBCH/PSS/SSS resources 540, the UE may rate-match PDSCH around the colliding RBs associated with that DMRS (e.g., in both TTI-0 and TTI-1) and not in cases where the DMRS occasion does not overlap with PBCH/PSS/SSS resources 540.

Figure 6:
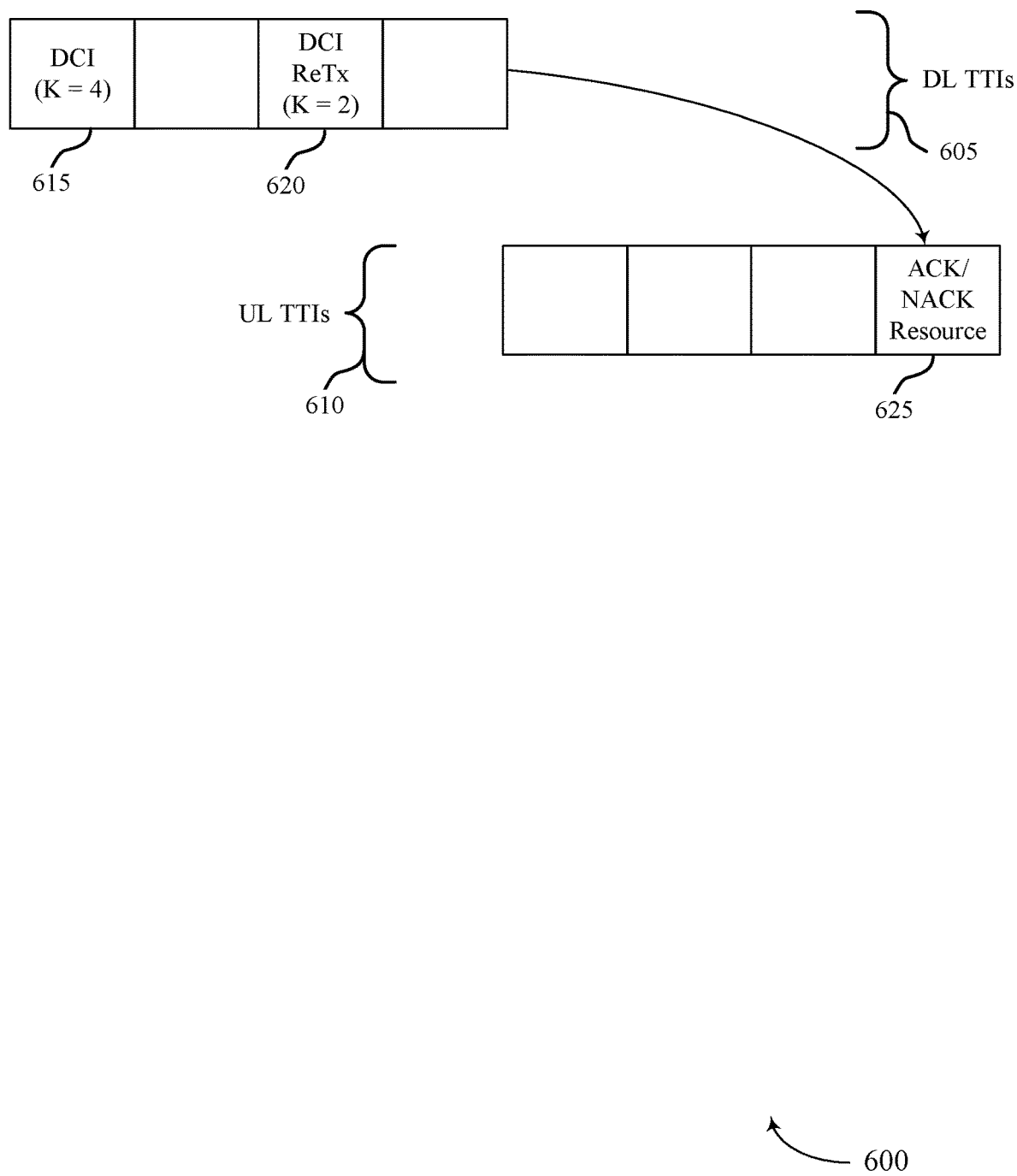
FIG. 6 illustrates an example of an uplink resource identification that supports rate-matching across downlink transmission repetitions in wireless communications in accordance with aspects of the present disclosure.

As indicated above, in some cases DCI repetitions may be implemented, which may provide an indication for uplink resources for uplink control information such as HARQ ACK/NACK feedback. FIG. 6 illustrates an example of an uplink resource identification 600 in accordance with aspects of the present disclosure. In some examples, uplink resource identification 600 may be implemented in aspects of wireless communications system 100 or 200. In the example of FIG. 6, downlink TTIs 605 may include a number or downlink repetitions which may include a first DCI transmission 615 and a second DCI transmission 620. Uplink TTIs 610 may include one or more uplink resources, which may include uplink ACK/NACK resource 625.

In some cases, when a base station transmits multiple DCI transmissions 615 and 620, the UE may follow the DCI indications provided in a first detected DCI. Thus, if the UE detects the first DCI transmission 615 first, the UE operates according to the DCI contained therein. However, if the UE misses the first DCI transmission 615 and detects the second DCI transmission 620, the UE operates according to the DCI in the second DCI transmission 620. In such cases, is a single uplink ACK/NACK resource 625 is allocated, each of the DCI transmissions 615 and 620 may both indicate the same uplink ACK/NACK resource 625. In some cases, a HARQ ACK/NACK timeline may be provided (e.g., an N+4 timeline) which may provide that ACK/NACK is to be ready to transmit by the fourth TTI following the downlink transmission, such as illustrated in FIG. 6. Further, in some cases the DCI transmissions 615 and 620 may indicate a number of repetitions of downlink transmissions are present.

In such cases, the first DCI transmission 615 may indicate that the repetition window is K=4, and the second DCI transmission 620 may indicate that the repetition window is K=2, such that a receiving UE will identify the same uplink ACK/NACK resources 625 regardless of which DCI is detected. Such a technique helps to reducing the complexity at the base station, as all the DCIs point to the same PUCCH resources and multiple hypothesis testing may be avoided. In some cases, the ACI/NACK resource indicator (ARI) in each DCI may be the same, or if implicit allocation is used, the index of the starting CCE may be the same. The base station may also allocate orthogonal resources (e.g., orthogonal physical resource blocks (PRBs)/cyclic shifts (CSs)/orthogonal cover codes (OCCs)/etc.) to different UEs such that PUCCH resources do not collide. In some cases, the base station may transmits multiple DCIs but K may not be decreased; in which cases the base station may monitor multiple different uplink resources for the uplink transmission and perform multiple hypothesis testing. In some cases, multiple DCI transmissions 615, 620 may be combined at a UE, as will be discussed with respect to FIG. 7.

Figure 7:
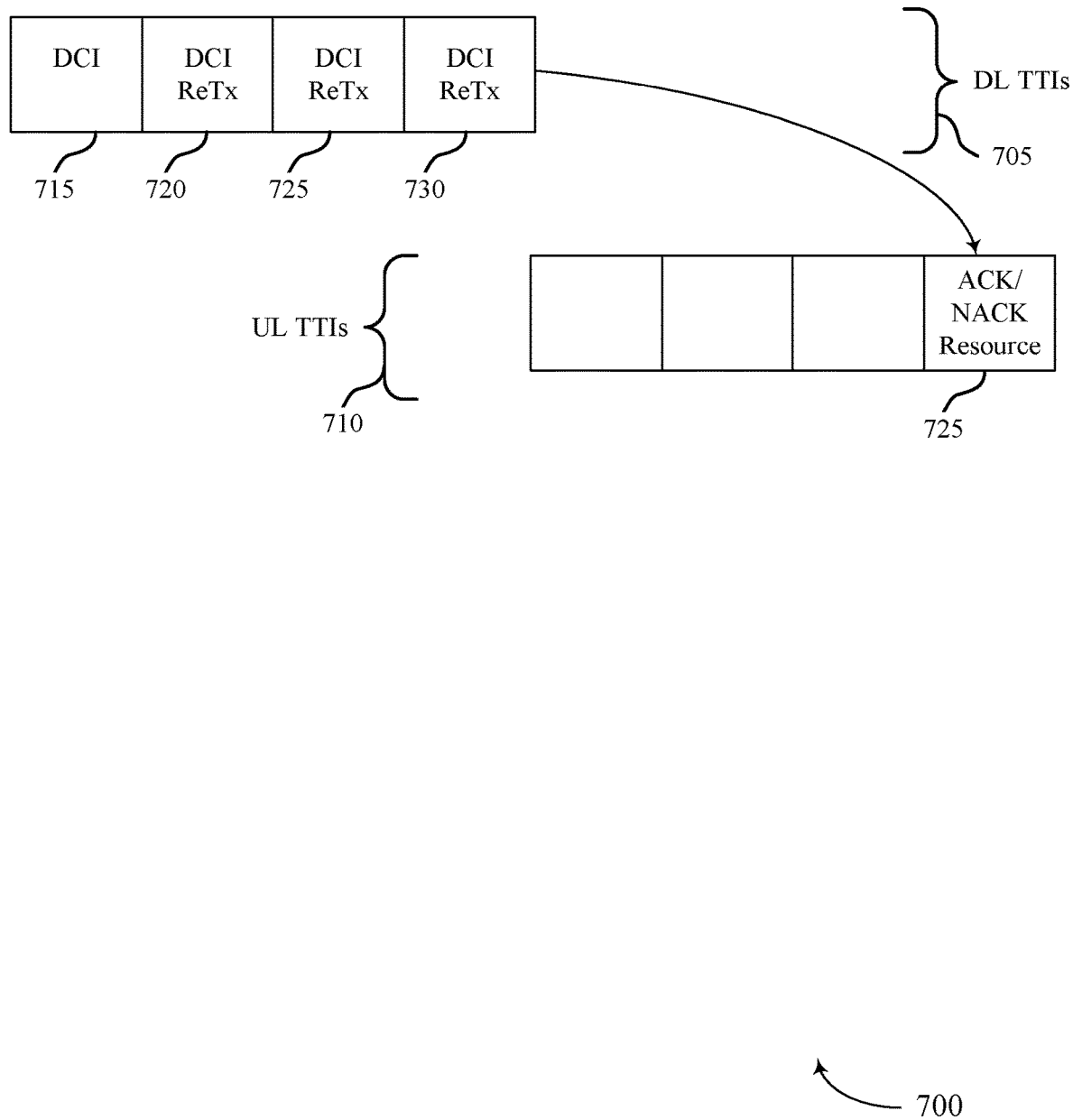
FIG. 7 illustrates an example of an uplink resource identification that supports rate-matching across downlink transmission repetitions in wireless communications in accordance with aspects of the present disclosure.

FIG. 7 illustrates an example of an uplink resource identification 700 in accordance with aspects of the present disclosure. In some examples, uplink resource identification 700 may implement aspects of wireless communications system 100. In the example of FIG. 7, downlink TTIs 705 may include a number or downlink repetitions, each of which may include a DCI transmission 715-730. Uplink TTIs 710 may include one or more uplink resources, which may include uplink ACK/NACK resource 725. In this example, a UE may be configured to combine received DCI repetitions 715-730, and thus the DCI contents of each instance of the DCI repetitions 715-730 may all be the same.

In such cases, if the PUCCH ACK/NACK resource 725 is given by DCI, then all of the PDCCHs DCI repetitions 715-730 may point to the same PUCCH resource. In some cases, such an indication may be an explicit indication, such as by using a same ARI. In other cases, such an indication may be given implicitly, such as by an index of the starting control channel element (CCE) of the PDCCH. In such cases, the base station may allocate downlink resources for the DCI repetitions 715-730 such that the starting CCE of each remains the same. In other cases, the starting CCE of one of the PDCCH DCI repetitions (e.g., first DCI repetition 715 in the time domain or a first repetition in the frequency domain) is used. In such cases, a base station may perform multiple hypothesis testing for the UCI in case the first DCI is missed. In further cases, the base station may avoid using implicit indications of the uplink ACK/NACK resources 725 in cases where DCI repetitions 715-730 are transmitted.

Figure 8:
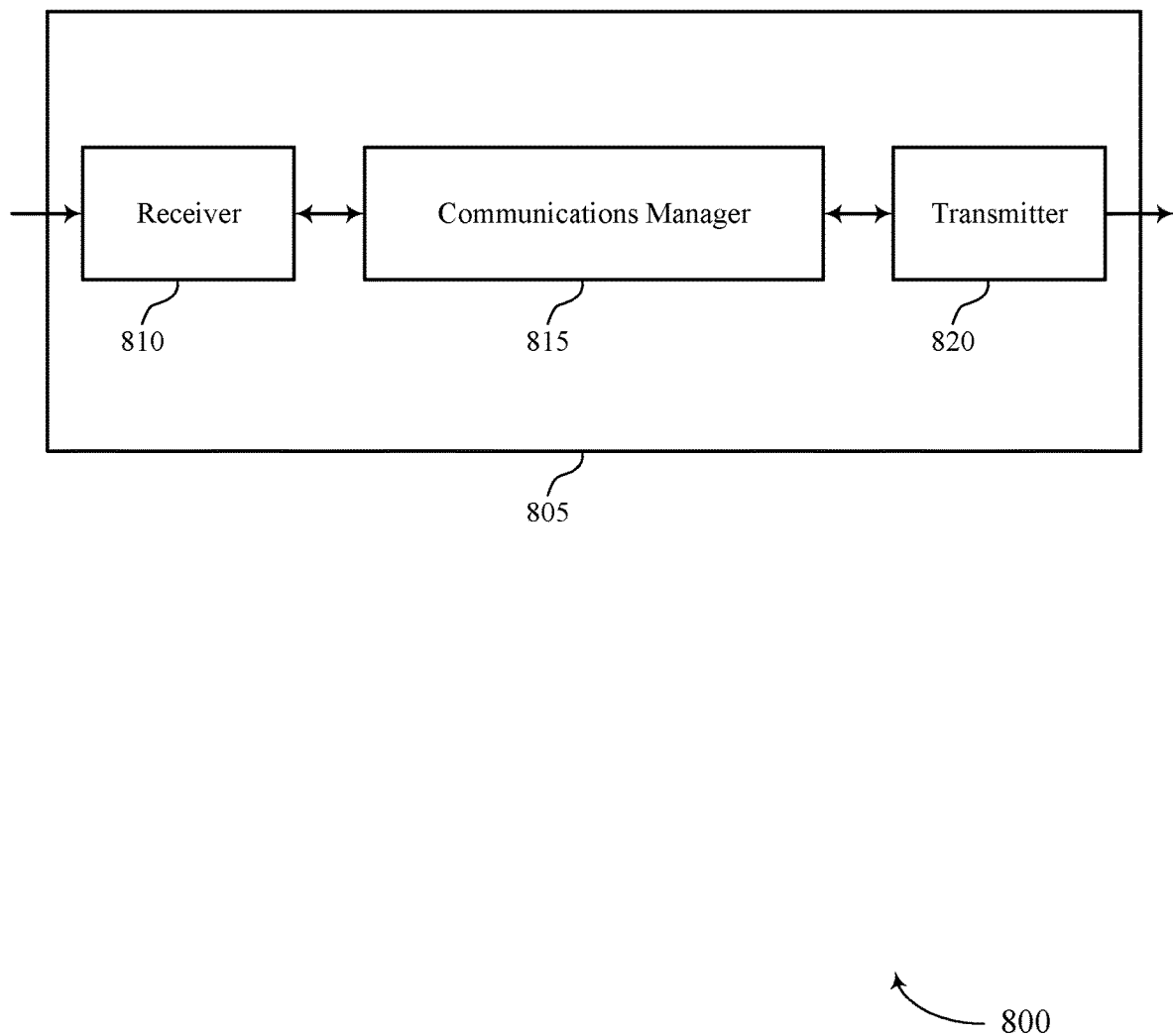
FIGS. 8 and 9 show block diagrams of devices that support rate-matching across downlink transmission repetitions in wireless communications in accordance with aspects of the present disclosure.

FIG. 8 shows a block diagram 800 of a device 805 that supports rate-matching across downlink transmission repetitions in wireless communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to rate-matching across downlink transmission repetitions in wireless communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a first set of control channel resources in a first TTI of a set of TTIs in which repetitions of a downlink shared channel transmission to the UE are transmitted, rate-match each repetition of the downlink shared channel transmission in each of the plurality of TTIs based at least in part on the first set of control channel resources to identify shared channel resources in each of the plurality of TTIs, and receive the downlink shared channel transmission via the shared channel resources in each of the set of TTIs.

The communications manager 815 may also receive a set of repetitions of DCI in a set of TTIs, decode at least a first instance of the DCI received in at least a first TTI of the set of TTIs, and identify uplink resources for acknowledging receipt of transmissions in all of the set of TTIs based on the first instance of the DCI. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
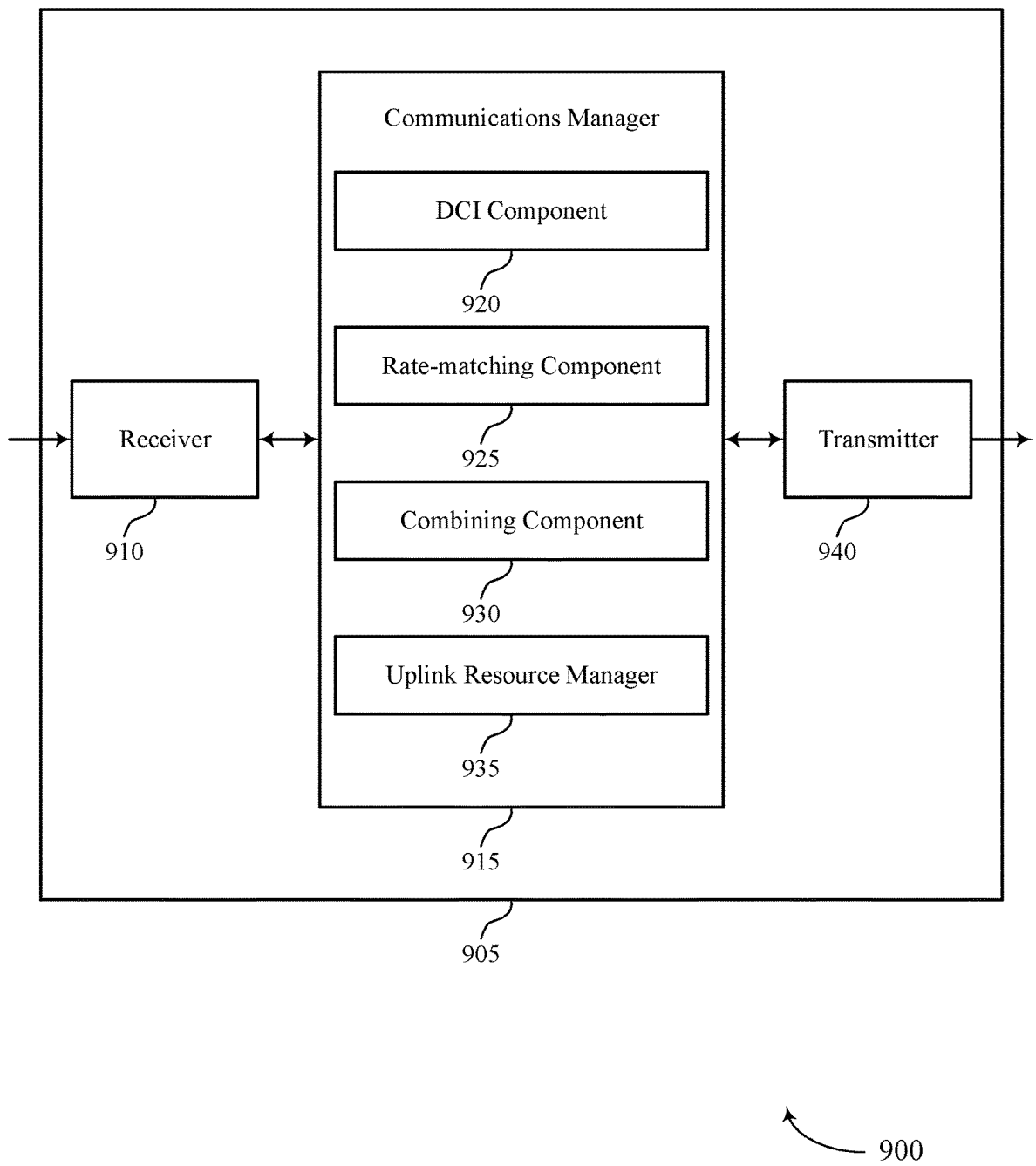

FIG. 9 shows a block diagram 900 of a device 905 that supports rate-matching across downlink transmission repetitions in wireless communications in accordance with aspects of the present disclosure. The device 905 may be an example of aspects of a device 805 or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to rate-matching across downlink transmission repetitions in wireless communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a DCI component 920, a rate-matching component 925, a combining component 930, and an uplink resource manager 935. The communications manager 915 may be an example of aspects of the communications manager 1110 described herein.

The DCI component 920 may receive first control information via a first set of control channel resources in a first TTI, the first control information including repetition information for a set of TTIs in which repetitions of a downlink shared channel transmission to the UE are transmitted. In some cases, the DCI component 920 may receive a set of repetitions of DCI in a set of TTIs and decode at least a first instance of the DCI received in at least a first TTI of the set of TTIs.

The rate-matching component 925 may rate-match each repetition of the downlink shared channel transmission in each of the plurality of TTIs based at least in part on the first set of control channel resources to identify shared channel resources in each of the plurality of TTIs.

The combining component 930 may combine (e.g., in a soft-combining buffer) multiple received downlink shared channel transmission received via the shared channel resources in each of the set of TTIs.

The uplink resource manager 935 may identify uplink resources for acknowledging receipt of transmissions in all of the set of TTIs based on the first instance of the DCI.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
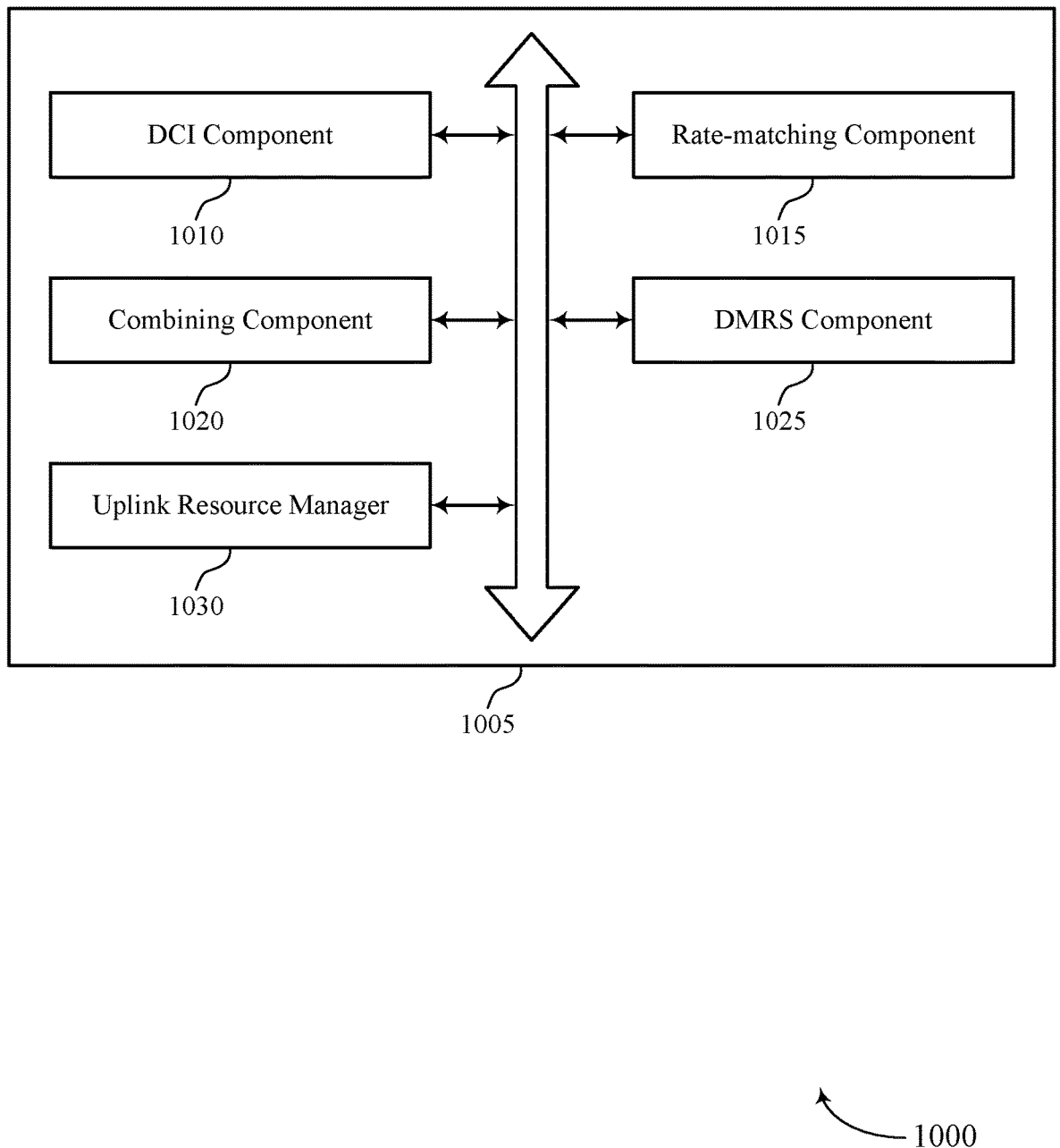
FIG. 10 shows a block diagram of a communications manager that supports rate-matching across downlink transmission repetitions in wireless communications in accordance with aspects of the present disclosure.

FIG. 10 shows a block diagram 1000 of a communications manager 1005 that supports rate-matching across downlink transmission repetitions in wireless communications in accordance with aspects of the present disclosure. The communications manager 1005 may be an example of aspects of a communications manager 815, a communications manager 915, or a communications manager 1110 described herein. The communications manager 1005 may include a DCI component 1010, a rate-matching component 1015, a combining component 1020, a DMRS component 1025, and an uplink resource manager 1030. Each of these modules may communicate, directly or indirectly, with one another (e.g., via one or more buses).

The DCI component 1010 may receive first control information via a first set of control channel resources in a first TTI, the first control information including repetition information for a set of TTIs in which repetitions of a downlink shared channel transmission to the UE are transmitted. In some examples, the DCI component 1010 may receive a set of repetitions of DCI in a set of TTIs. In some examples, the DCI component 1010 may decode at least a first instance of the DCI received in at least a first TTI of the set of TTIs. In some examples, the DCI component 1010 may receive two or more instances of the first control information in two or more TTIs of the set of TTIs, where each of the two or more instances are received via same control channel resources as the first set of control channel resources. In some cases, the first set of control channel resources includes a subset of a set of resources configurable for control channel transmissions, and where the shared channel resources in each of the set of TTIs include at least a portion of the set of resources configurable for control channel transmissions. In some cases, the first set of control channel resources are configured in the first control information semi-statically or dynamically. In some cases, the first control information indicates a number of repetitions of the downlink shared channel transmission.

In some cases, DCI may be repeated in multiple TTIs, and each repetition of the DCI includes an index indicating a location of the uplink resources relative to a TTI of the set of TTIs containing the DCI, and where the index of each subsequent repetition of the DCI is adjusted to indicate a same location of the uplink resources. In some cases, a location of the uplink resources is determined based on a first decoded instance of the DCI, and where one or more subsequent instances of the DCI are ignored. In some cases, the DCI includes an explicit indication of the uplink resources. In some cases, the DCI includes an implicit indication of uplink resources based on index of a starting control channel element (CCE) of the DCI. In some cases, the starting CCE of the DCI is a same CCE for each of the set of repetitions of the DCI. In some cases, the starting CCE of the DCI is a different CCE for at least one of the set of repetitions of the DCI, and where the implicit indication of the uplink resources is based on an index of the starting CCE of a first instance of the DCI.

The rate-matching component 1015 may rate-match each repetition of the downlink shared channel transmission in each of the plurality of TTIs based at least in part on the first set of control channel resources to identify shared channel resources in each of the plurality of TTIs. In some examples, a second set of resources for transmission of one or more of a PBCH, a PSS, or a SSS may be identified, and the rate-matching further includes rate-matching one or more repetitions of the downlink shared channel transmission around the second set of resources. In some cases, the rate-matching around the second set of resources is performed for each TTI of the set of TTIs irrespective of whether one or more of the PBCH, PSS, or SSS is scheduled in the TTI.

In some cases, the first set of control channel resources are configured dynamically in the first control information, and the rate-matching includes determining a rate-matching mode for the first set of control channel resources based at least on a dynamic indication field in the first control information, rate-matching the downlink shared channel transmission of the first TTI based at least in part on the determined rate-matching mode, and rate-matching each remaining TTI of the plurality of TTIs based at least in part on the rate-matching mode for the first set of control channel resources. In some cases, the dynamic indication field indicates rate-matching around only the first control information or rate-matching around an entire RB set and whether such rate-matching is performed in the presence or absence of control information within the TTI, and the rate-matching each remaining TTI is performed according to the dynamic indication field and assuming that none of the remaining TTIs include control information. In some cases, the rate-matching each remaining TTI is performed according to a semi-static configuration to rate-match around an entire RB set or to not perform rate-matching in each remaining TTI after the first TTI. In some cases, the semi-static configuration is provided via RRC signaling.

The combining component 1020 may receive the downlink shared channel transmission via the shared channel resources in each of the set of TTIs. In some examples, the combining component 1020 may combine multiple instances of the DCI, and where the uplink resources are further identified based on the combined DCI.

The uplink resource manager 1030 may identify uplink resources for acknowledging receipt of transmissions in all of the set of TTIs based on the first instance of the DCI.

The DMRS component 1025 may determine that one or more resource blocks (RBs) of the downlink shared channel transmission of a second TTI is to be demodulated based on a DMRS scheduled in the first TTI. In some examples, the DMRS component 1025 may identify that a DMRS occasion of at least a first RB collides with the second set of resources in the first TTI. In some examples, the DMRS component 1025 may rate-match the downlink shared channel transmission of the second TTI around the first RB in the second TTI.

Figure 11:
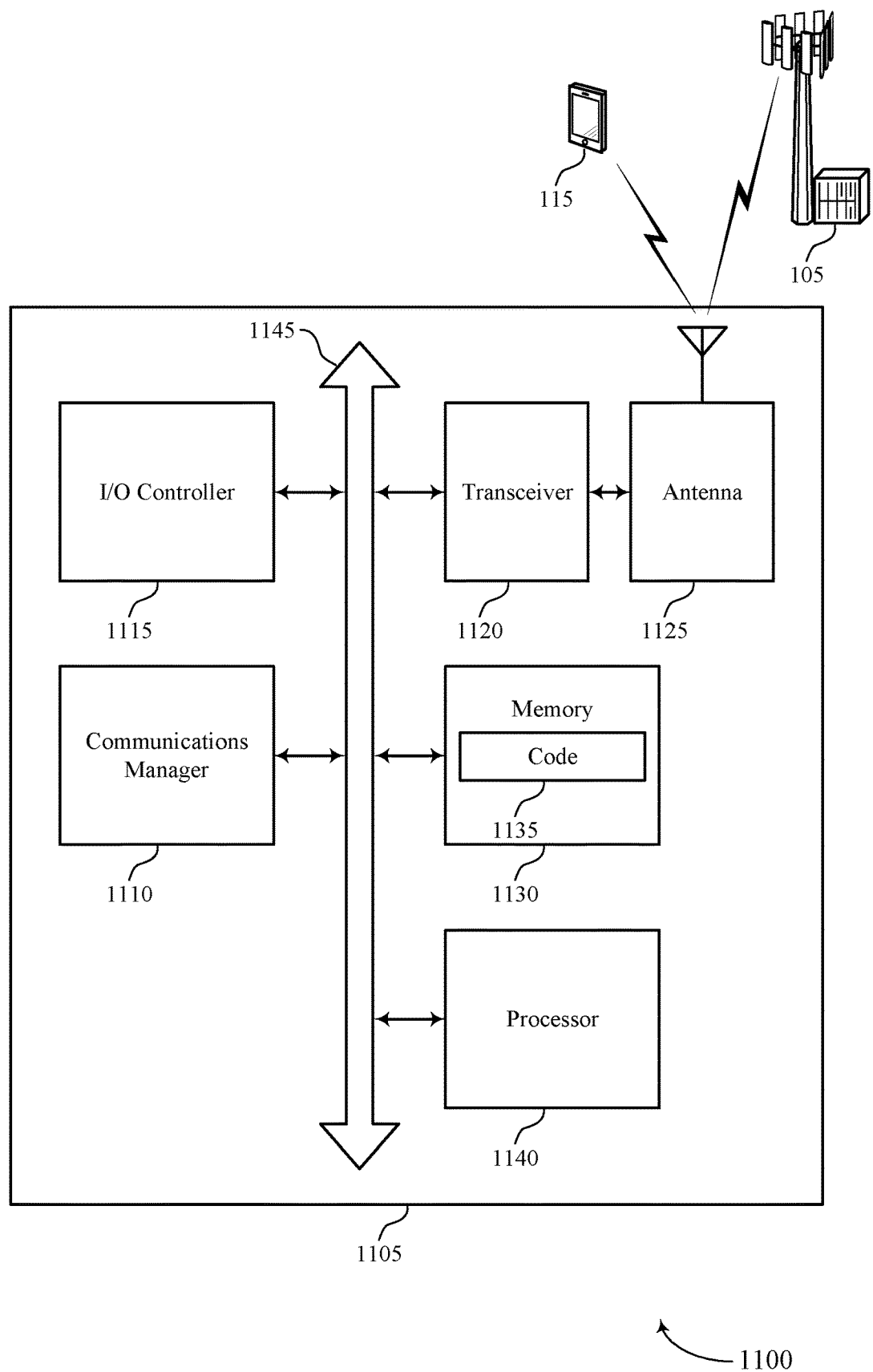
FIG. 11 shows a diagram of a system including a device that supports rate-matching across downlink transmission repetitions in wireless communications in accordance with aspects of the present disclosure.

FIG. 11 shows a diagram of a system 1100 including a device 1105 that supports rate-matching across downlink transmission repetitions in wireless communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a first set of control channel resources in a first TTI of a set of TTIs in which repetitions of a downlink shared channel transmission to the UE are transmitted, rate-match each repetition of the downlink shared channel transmission around the first set of control channel resources in each of the set of TTIs to identify shared channel resources in each of the set of TTIs, and receive the downlink shared channel transmission via the shared channel resources in each of the set of TTIs. The communications manager 1110 may also receive a set of repetitions of DCI in a set of transmission time intervals (TTIs), decode at least a first instance of the DCI received in at least a first TTI of the set of TTIs, and identify uplink resources for acknowledging receipt of transmissions in all of the set of TTIs based on the first instance of the DCI.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting rate-matching across downlink transmission repetitions in wireless communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
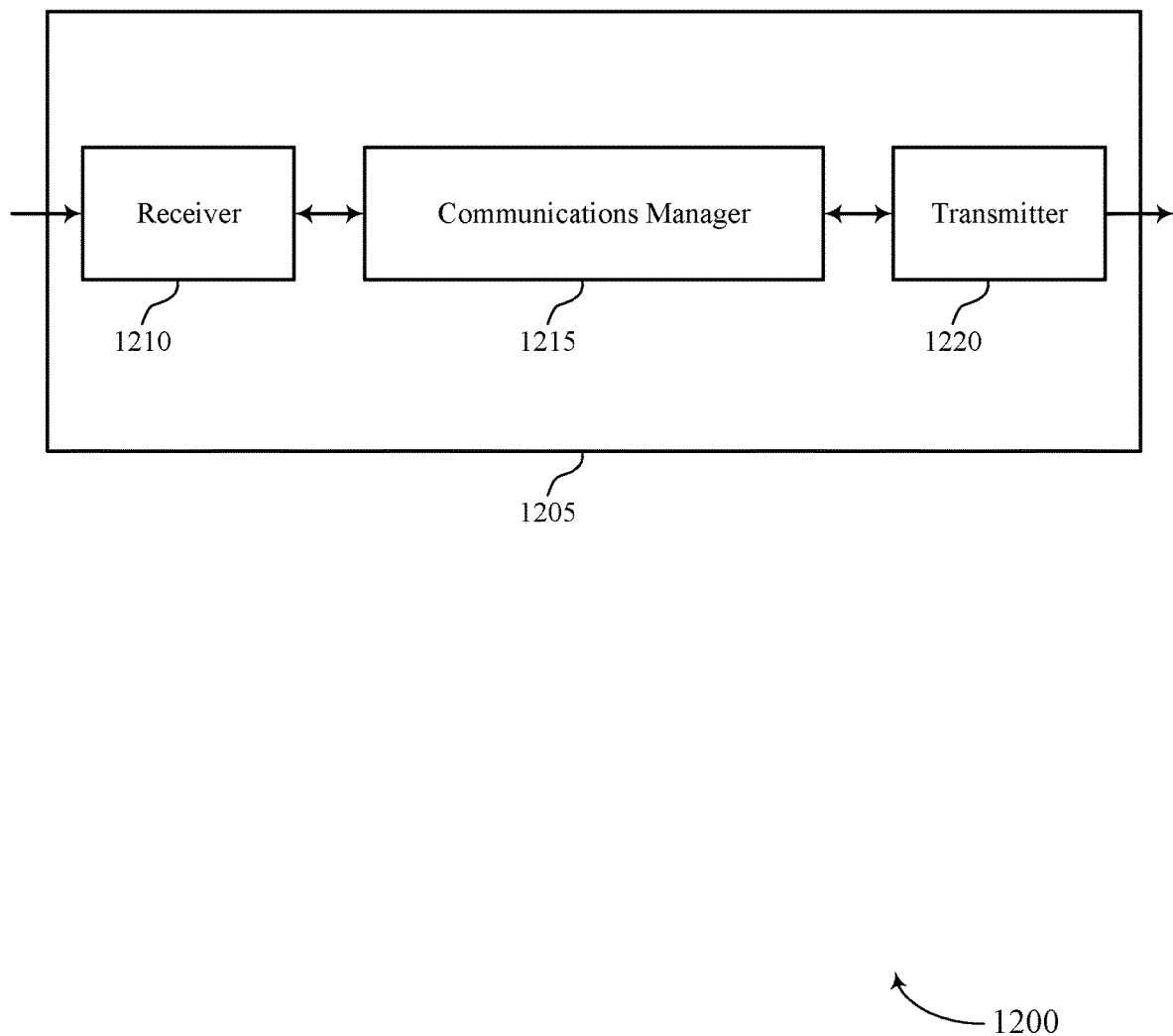
FIGS. 12 and 13 show block diagrams of devices that support rate-matching across downlink transmission repetitions in wireless communications in accordance with aspects of the present disclosure.

FIG. 12 shows a block diagram 1200 of a device 1205 that supports rate-matching across downlink transmission repetitions in wireless communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to rate-matching across downlink transmission repetitions in wireless communications, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a first set of control channel resources in a first TTI of a set of TTIs in which repetitions of a downlink shared channel transmission to a UE are transmitted, rate-match each repetition of the downlink shared channel transmission in each of the plurality of TTIs based at least in part on the first set of control channel resources, and transmit the repetitions of the downlink shared channel transmission in each of the set of TTIs.

The communications manager 1215 may also identify a set of TTIs for transmission of a set of repetitions of DCI to a UE, transmit the set of repetitions of DCI to the UE in at least a subset of the set of TTIs, and format at least a first instance of the DCI to indicate uplink resources allocated for the UE to acknowledge receipt of transmissions in all of the set of TTIs. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
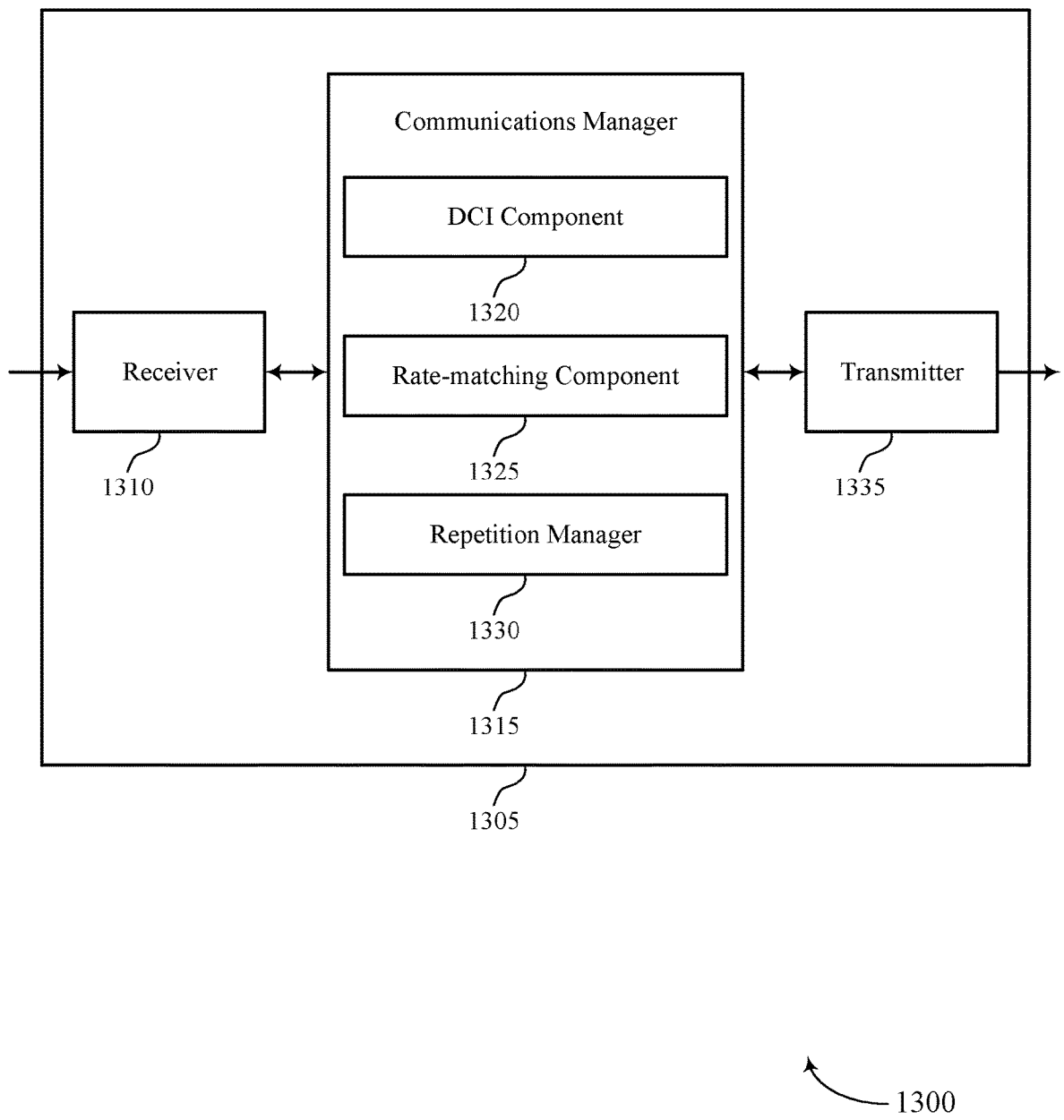

FIG. 13 shows a block diagram 1300 of a device 1305 that supports rate-matching across downlink transmission repetitions in wireless communications in accordance with aspects of the present disclosure. The device 1305 may be an example of aspects of a device 1205 or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to rate-matching across downlink transmission repetitions in wireless communications, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a DCI component 1320, a rate-matching component 1325, and a repetition manager 1330. The communications manager 1315 may be an example of aspects of the communications manager 1510 described herein.

The DCI component 1320 may transmit first control information via a first set of control channel resources in a first TTI, the first control information including repetition information for a set of TTIs in which repetitions of a downlink shared channel transmission to a UE are transmitted. In some cases, the repetition information for the set of TTIs in the first control information comprises a trigger to activate the repetitions of the downlink shared channel transmission that may be configured earlier such as via radio resource control (RRC) signaling. In some cases, the DCI component 1320 may format at least a first instance of the DCI to indicate uplink resources allocated for the UE to acknowledge receipt of transmissions in all of the set of TTIs.

The rate-matching component 1325 may rate-match each repetition of the downlink shared channel transmission in each of the plurality of TTIs based at least in part on the first set of control channel resources.

The repetition manager 1330 may transmit the repetitions of the downlink shared channel transmission in each of the set of TTIs. In some cases, the repetition manager 1330 may identify a set of TTIs for transmission of a set of repetitions of DCI to a UE and transmit the set of repetitions of DCI to the UE in at least a subset of the set of TTIs.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
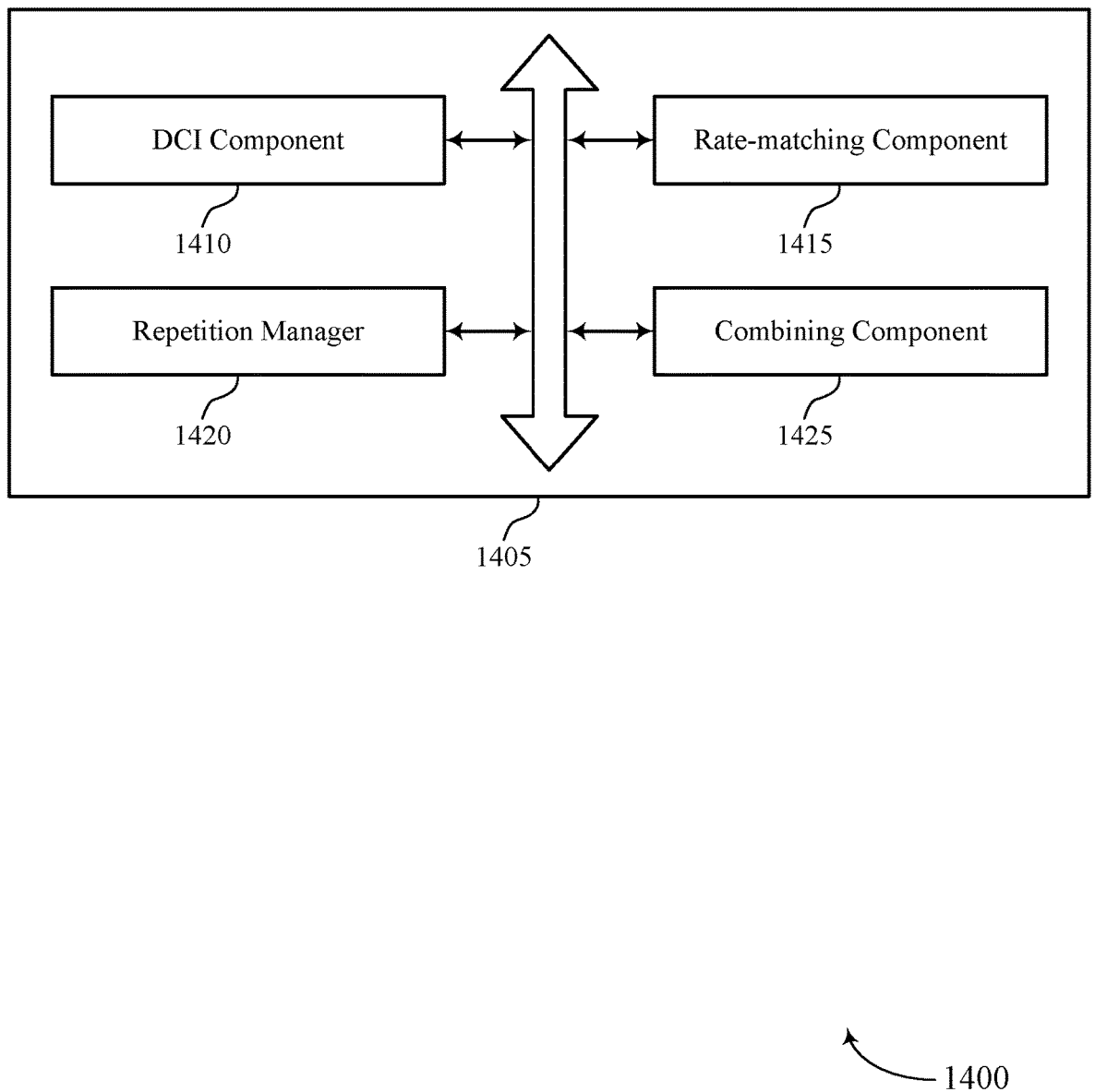
FIG. 14 shows a block diagram of a communications manager that supports rate-matching across downlink transmission repetitions in wireless communications in accordance with aspects of the present disclosure.

FIG. 14 shows a block diagram 1400 of a communications manager 1405 that supports rate-matching across downlink transmission repetitions in wireless communications in accordance with aspects of the present disclosure. The communications manager 1405 may be an example of aspects of a communications manager 1215, a communications manager 1315, or a communications manager 1510 described herein. The communications manager 1405 may include a DCI component 1410, a rate-matching component 1415, a repetition manager 1420, and a combining component 1425. Each of these modules may communicate, directly or indirectly, with one another (e.g., via one or more buses).

The DCI component 1410 may transmit first control information via a first set of control channel resources in a first TTI, the first control information including repetition information for a set of TTIs in which repetitions of a downlink shared channel transmission to a UE are transmitted. In some examples, the DCI component 1410 may format at least a first instance of the DCI to indicate uplink resources allocated for the UE to acknowledge receipt of transmissions in all of the set of TTIs. In some cases, the first set of control channel resources includes a subset of a set of resources configurable for control channel transmissions, and where shared channel resources in each of the set of TTIs for the downlink shared channel transmissions include at least a portion of the set of resources configurable for control channel transmissions. In some cases, the first set of control channel resources are configured in the first control information semi-statically or dynamically. In some cases, the first control information indicates a number of repetitions of the downlink shared channel transmission.

In some cases, the DCI indicates a number of TTIs of the set of TTIs. In some cases, each repetition of the DCI includes an index indicating a location of the uplink resources relative to a TTI of the set of TTIs containing the DCI, and where the index of each subsequent repetition of the DCI is adjusted to indicate a same location of the uplink resources. In some cases, a location of the uplink resources is determined based on a first decoded instance of the DCI, and where one or more subsequent instances of the DCI are ignored. In some cases, the DCI includes an explicit indication of the uplink resources. In some cases, the DCI includes an implicit indication of uplink resources based on index of a starting control channel element (CCE) of the DCI. In some cases, the starting CCE of the DCI is a same CCE for each of the set of repetitions of the DCI. In some cases, the starting CCE of the DCI is a different CCE for at least one of the set of repetitions of the DCI, and where the implicit indication of the uplink resources is based on an index of the starting CCE of a first instance of the DCI.

The rate-matching component 1415 may rate-match each repetition of the downlink shared channel transmission around the first set of control channel resources in each of the set of TTIs. In some examples, a second set of resources for transmission of one or more of a PBCH, a PSS, or a SSS may be identified, and the rate-matching further includes rate-matching one or more repetitions of the downlink shared channel transmission around the second set of resources. In some cases, the rate-matching around the second set of resources is performed for each TTI of the set of TTIs irrespective of whether one or more of the PBCH, PSS, or SSS is scheduled in the TTI. In some cases, the first set of control channel resources are configured dynamically in the first control information, and the rate-matching includes dynamically determining a rate-matching mode for the first set of control channel resources, setting a dynamic indication field in the first control information to indicate the rate-matching mode to the UE, rate-matching the downlink shared channel transmission of the first TTI based at least in part on the determined rate-matching mode, and rate-matching each remaining TTI of the plurality of TTIs based at least in part on the rate-matching mode for the first set of control channel resources. In some cases, the dynamic indication field indicates rate-matching around only the first control information or rate-matching around an entire RB set and whether such rate-matching is performed in the presence or absence of control information within the TTI, and the rate-matching each remaining TTI is performed according to the dynamic indication field and assuming that none of the remaining TTIs include control information. In some cases, a semi-static configuration may be provided to the UE to rate-match around an entire RB set or to not perform rate-matching in each remaining TTI after the first TTI. In some cases, the semi-static configuration is provided via RRC signaling.

The repetition manager 1420 may transmit the repetitions of the downlink shared channel transmission in each of the set of TTIs. In some examples, the repetition manager 1420 may identify a set of TTIs for transmission of a set of repetitions of DCI to a UE. In some examples, the repetition manager 1420 may transmit the set of repetitions of DCI to the UE in at least a subset of the set of TTIs. In some examples, the repetition manager 1420 may transmit two or more instances of the first control information in two or more TTIs of the set of TTIs, where each of the two or more instances are transmitted via same control channel resources as the first set of control channel resources.

The combining component 1425 may configure multiple instances of the DCI to be combined at the UE, and where the multiple instances of the DCI include identical information.

Figure 15:
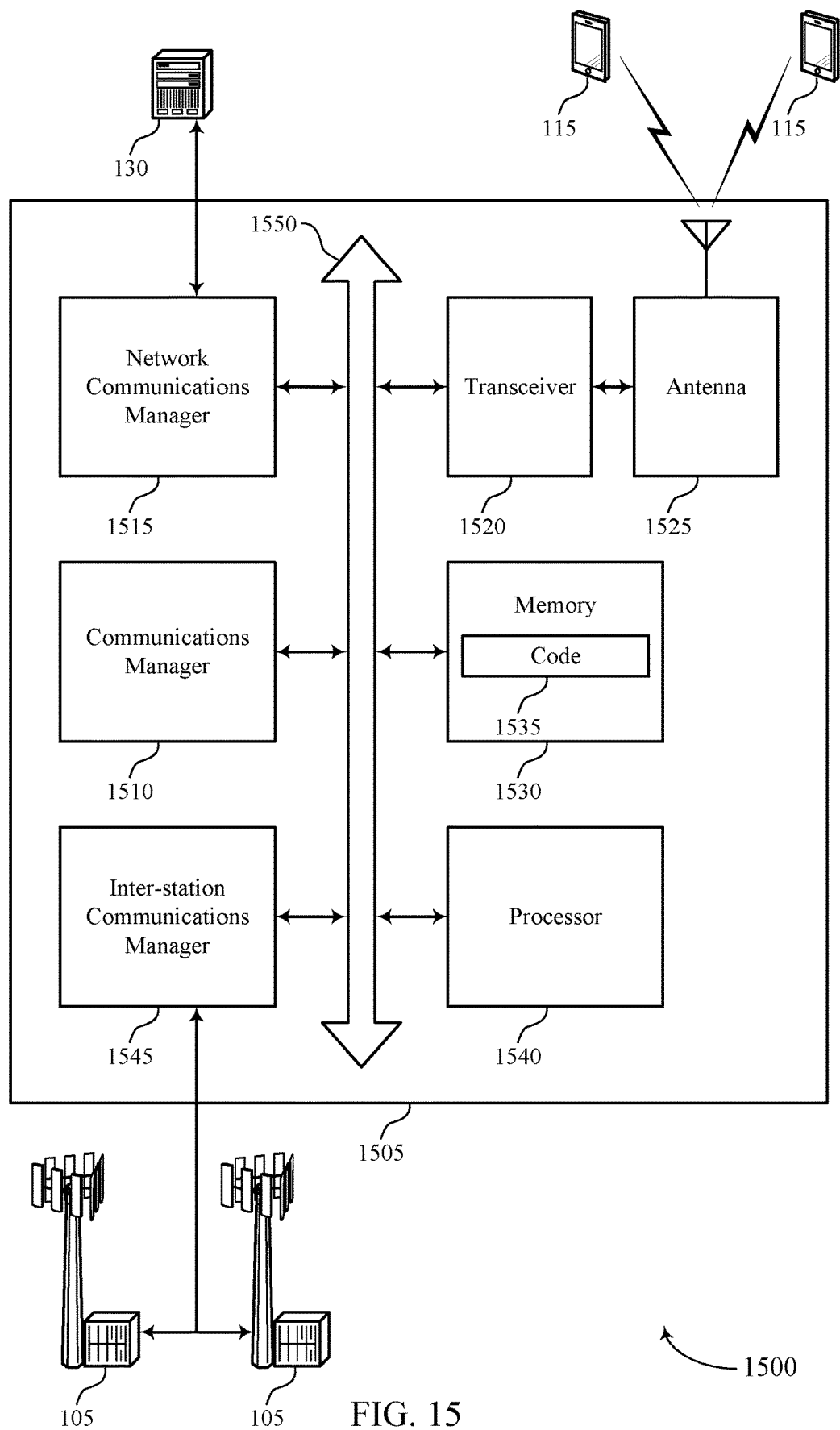
FIG. 15 shows a diagram of a system including a device that supports rate-matching across downlink transmission repetitions in wireless communications in accordance with aspects of the present disclosure.

FIG. 15 shows a diagram of a system 1500 including a device 1505 that supports rate-matching across downlink transmission repetitions in wireless communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a first set of control channel resources in a first TTI of a set of TTIs in which repetitions of a downlink shared channel transmission to a UE are transmitted, rate-match each repetition of the downlink shared channel transmission around the first set of control channel resources in each of the set of TTIs, and transmit the repetitions of the downlink shared channel transmission in each of the set of TTIs. The communications manager 1510 may also identify a set of transmission time intervals (TTIs) for transmission of a set of repetitions of DCI to a UE, transmit the set of repetitions of DCI to the UE in at least a subset of the set of transmission time intervals (TTIs), and format at least a first instance of the DCI to indicate uplink resources allocated for the UE to acknowledge receipt of transmissions in all of the set of TTIs.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device to perform various functions (e.g., functions or tasks supporting rate-matching across downlink transmission repetitions in wireless communications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
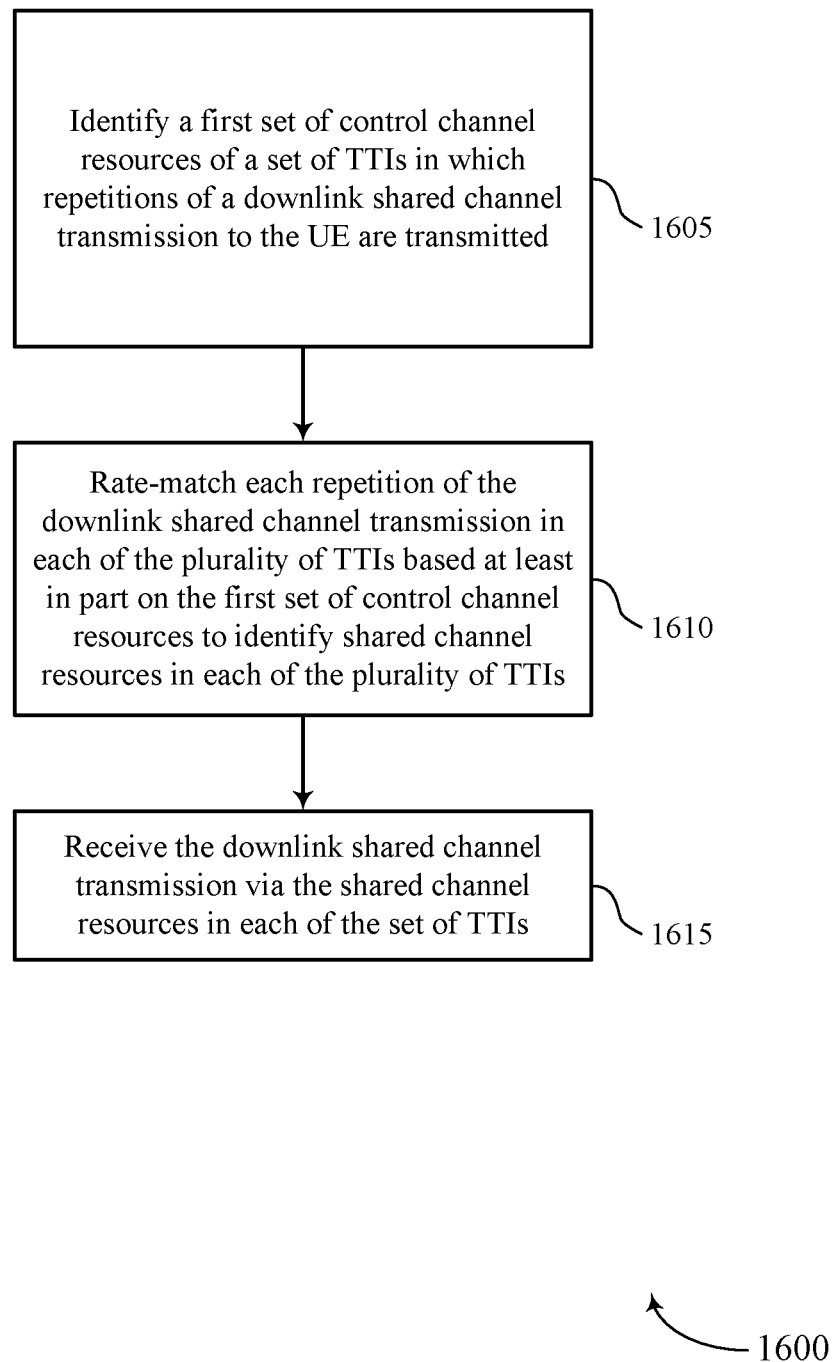
FIGS. 16 through 23 show flowcharts illustrating methods that support rate-matching across downlink transmission repetitions in wireless communications in accordance with aspects of the present disclosure.

FIG. 16 shows a flowchart illustrating a method 1600 that supports rate-matching across downlink transmission repetitions in wireless communications in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify a first set of control channel resources in a first TTI of a set of TTIs in which repetitions of a downlink shared channel transmission to the UE are transmitted. The operations of 1605 may be performed according to the methods described herein. In some examples, aspects of the operations of 1605 may be performed by a DCI component as described with reference to FIGS. 8 through 11.

At 1610, the UE may rate-match each repetition of the downlink shared channel transmission in each of the plurality of TTIs based at least in part on the first set of control channel resources to identify shared channel resources in each of the plurality of TTIs. The operations of 1610 may be performed according to the methods described herein. In some examples, aspects of the operations of 1610 may be performed by a rate-matching component as described with reference to FIGS. 8 through 11.

At 1615, the UE may receive the downlink shared channel transmission via the shared channel resources in each of the set of TTIs. The operations of 1615 may be performed according to the methods described herein. In some examples, aspects of the operations of 1615 may be performed by a combining component as described with reference to FIGS. 8 through 11.

Figure 17:
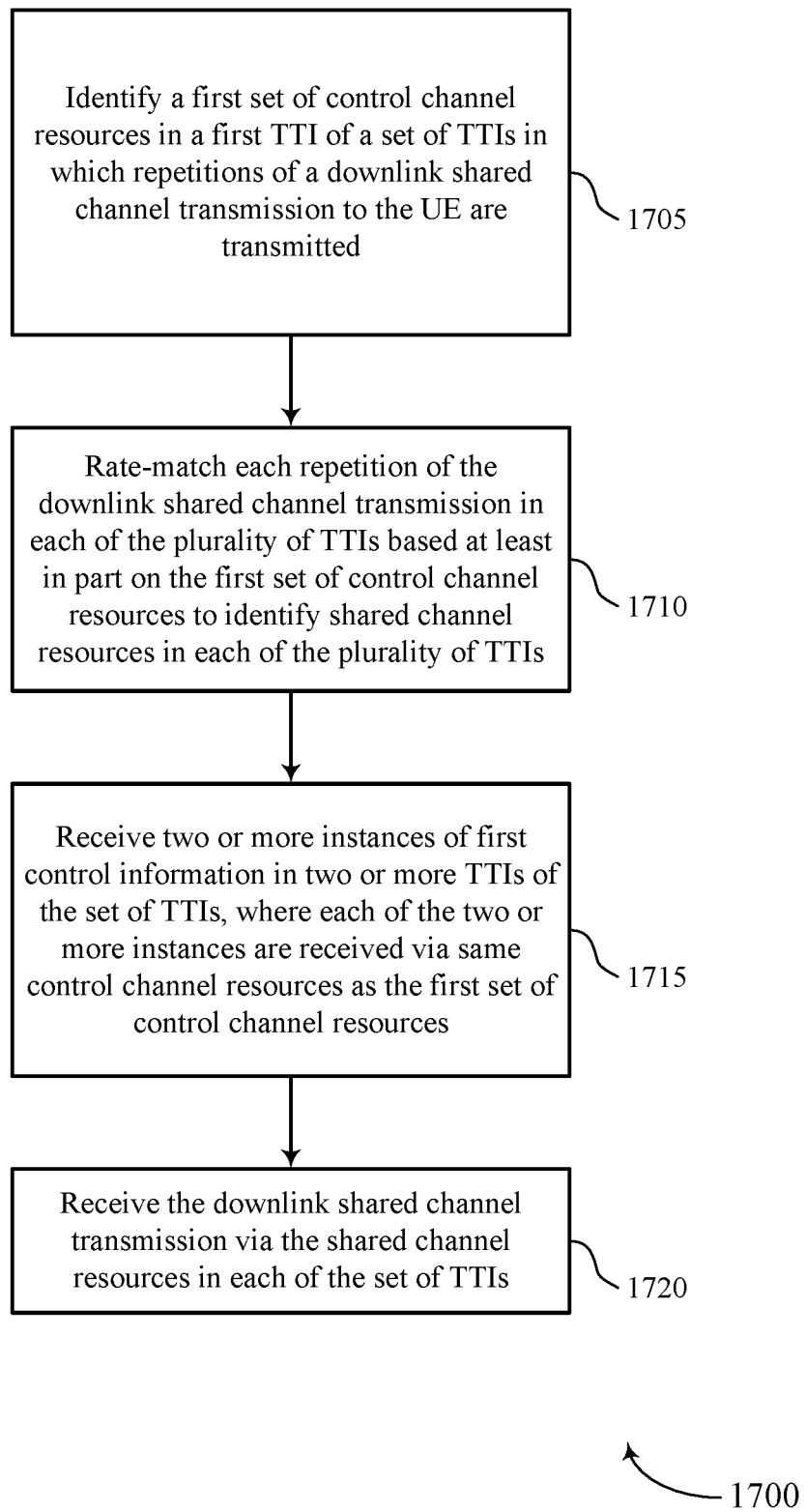

FIG. 17 shows a flowchart illustrating a method 1700 that supports rate-matching across downlink transmission repetitions in wireless communications in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may identify a first set of control channel resources in a first TTI of a set of TTIs in which repetitions of a downlink shared channel transmission to the UE are transmitted. The operations of 1705 may be performed according to the methods described herein. In some examples, aspects of the operations of 1705 may be performed by a DCI component as described with reference to FIGS. 8 through 11.

At 1710, the UE may rate-match each repetition of the downlink shared channel transmission in each of the plurality of TTIs based at least in part on the first set of control channel resources to identify shared channel resources in each of the plurality of TTIs. The operations of 1710 may be performed according to the methods described herein. In some examples, aspects of the operations of 1710 may be performed by a rate-matching component as described with reference to FIGS. 8 through 11.

At 1715, the UE may receive two or more instances of first control information in two or more TTIs of the set of TTIs, where each of the two or more instances are received via same control channel resources as the first set of control channel resources. The operations of 1715 may be performed according to the methods described herein. In some examples, aspects of the operations of 1715 may be performed by a DCI component as described with reference to FIGS. 8 through 11.

At 1720, the UE may receive the downlink shared channel transmission via the shared channel resources in each of the set of TTIs. The operations of 1720 may be performed according to the methods described herein. In some examples, aspects of the operations of 1720 may be performed by a combining component as described with reference to FIGS. 8 through 11.

Figure 18:
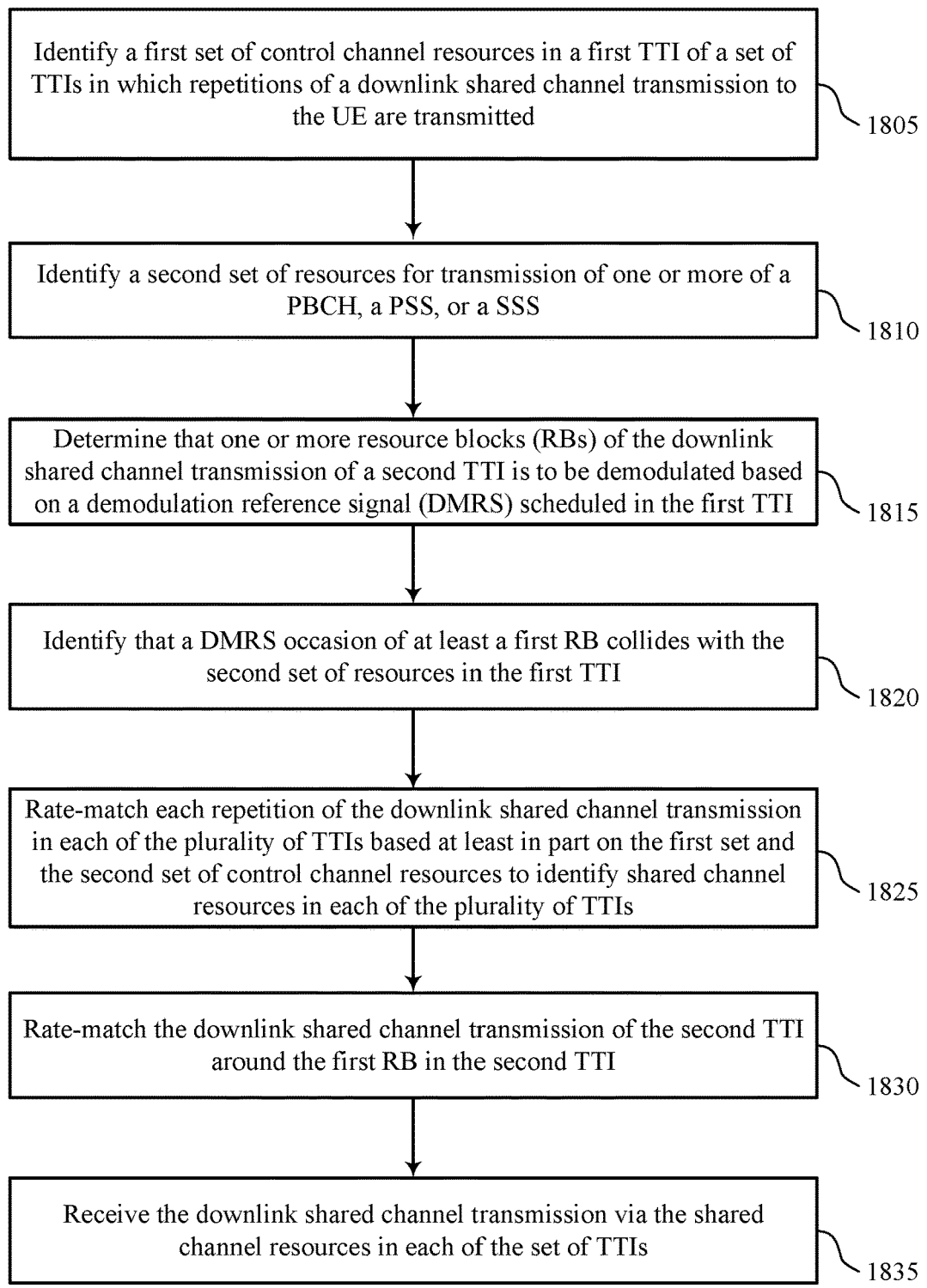

FIG. 18 shows a flowchart illustrating a method 1800 that supports rate-matching across downlink transmission repetitions in wireless communications in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may identify a first set of control channel resources in a first TTI of a set of TTIs in which repetitions of a downlink shared channel transmission to the UE are transmitted. The operations of 1805 may be performed according to the methods described herein. In some examples, aspects of the operations of 1805 may be performed by a DCI component as described with reference to FIGS. 8 through 11.

At 1810, the UE may identify a second set of resources for transmission of one or more of a PBCH, a PSS, or a SSS. The operations of 1810 may be performed according to the methods described herein. In some examples, aspects of the operations of 1810 may be performed by a rate-matching component as described with reference to FIGS. 8 through 11.

At 1815, the UE may determine that one or more RBs of the downlink shared channel transmission of a second TTI is to be demodulated based on a DMRS scheduled in the first TTI. The operations of 1815 may be performed according to the methods described herein. In some examples, aspects of the operations of 1815 may be performed by a DMRS component as described with reference to FIGS. 8 through 11.

At 1820, the UE may identify that a DMRS occasion of at least a first RB collides with the second set of resources in the first TTI. The operations of 1820 may be performed according to the methods described herein. In some examples, aspects of the operations of 1820 may be performed by a DMRS component as described with reference to FIGS. 8 through 11.

At 1825, the UE may rate-match each repetition of the downlink shared channel transmission in each of the plurality of TTIs based at least in part on the first set and the second set of control channel resources to identify shared channel resources in each of the plurality of TTIs. The operations of 1825 may be performed according to the methods described herein. In some examples, aspects of the operations of 1825 may be performed by a rate-matching component as described with reference to FIGS. 8 through 11.

At 1830, the UE may rate-match the downlink shared channel transmission of the second TTI around the first RB in the second TTI. The operations of 1830 may be performed according to the methods described herein. In some examples, aspects of the operations of 1830 may be performed by a DMRS component as described with reference to FIGS. 8 through 11.

At 1835, the UE may receive the downlink shared channel transmission via the shared channel resources in each of the set of TTIs. The operations of 1835 may be performed according to the methods described herein. In some examples, aspects of the operations of 1835 may be performed by a combining component as described with reference to FIGS. 8 through 11.

Figure 19:
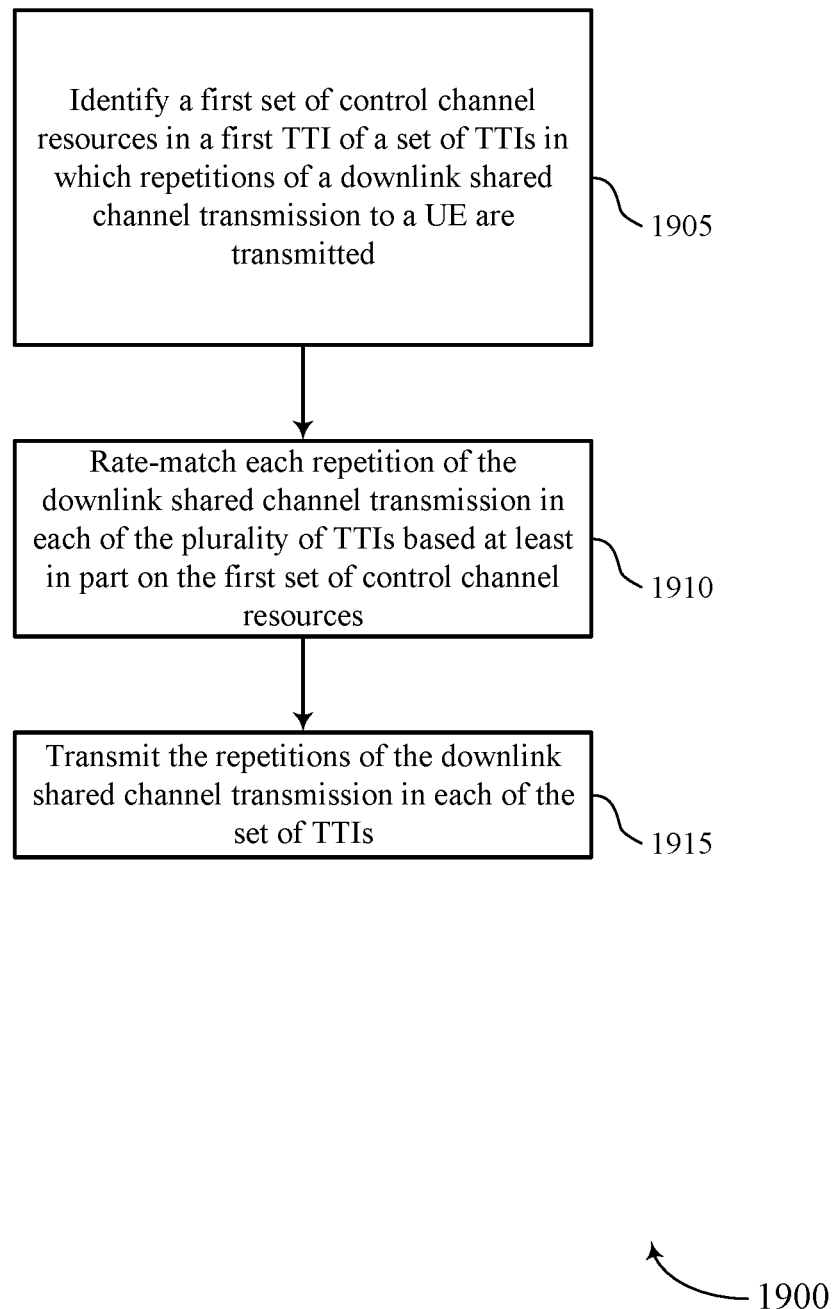

FIG. 19 shows a flowchart illustrating a method 1900 that supports rate-matching across downlink transmission repetitions in wireless communications in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may identify a first set of control channel resources in a first TTI of a set of TTIs in which repetitions of a downlink shared channel transmission to a UE are transmitted. The operations of 1905 may be performed according to the methods described herein. In some examples, aspects of the operations of 1905 may be performed by a DCI component as described with reference to FIGS. 12 through 15.

At 1910, the base station may rate-match each repetition of the downlink shared channel transmission in each of the plurality of TTIs based at least in part on the first set of control channel resources. The operations of 1910 may be performed according to the methods described herein. In some examples, aspects of the operations of 1910 may be performed by a rate-matching component as described with reference to FIGS. 12 through 15.

At 1915, the base station may transmit the repetitions of the downlink shared channel transmission in each of the set of TTIs. The operations of 1915 may be performed according to the methods described herein. In some examples, aspects of the operations of 1915 may be performed by a repetition manager as described with reference to FIGS. 12 through 15.

Figure 20:
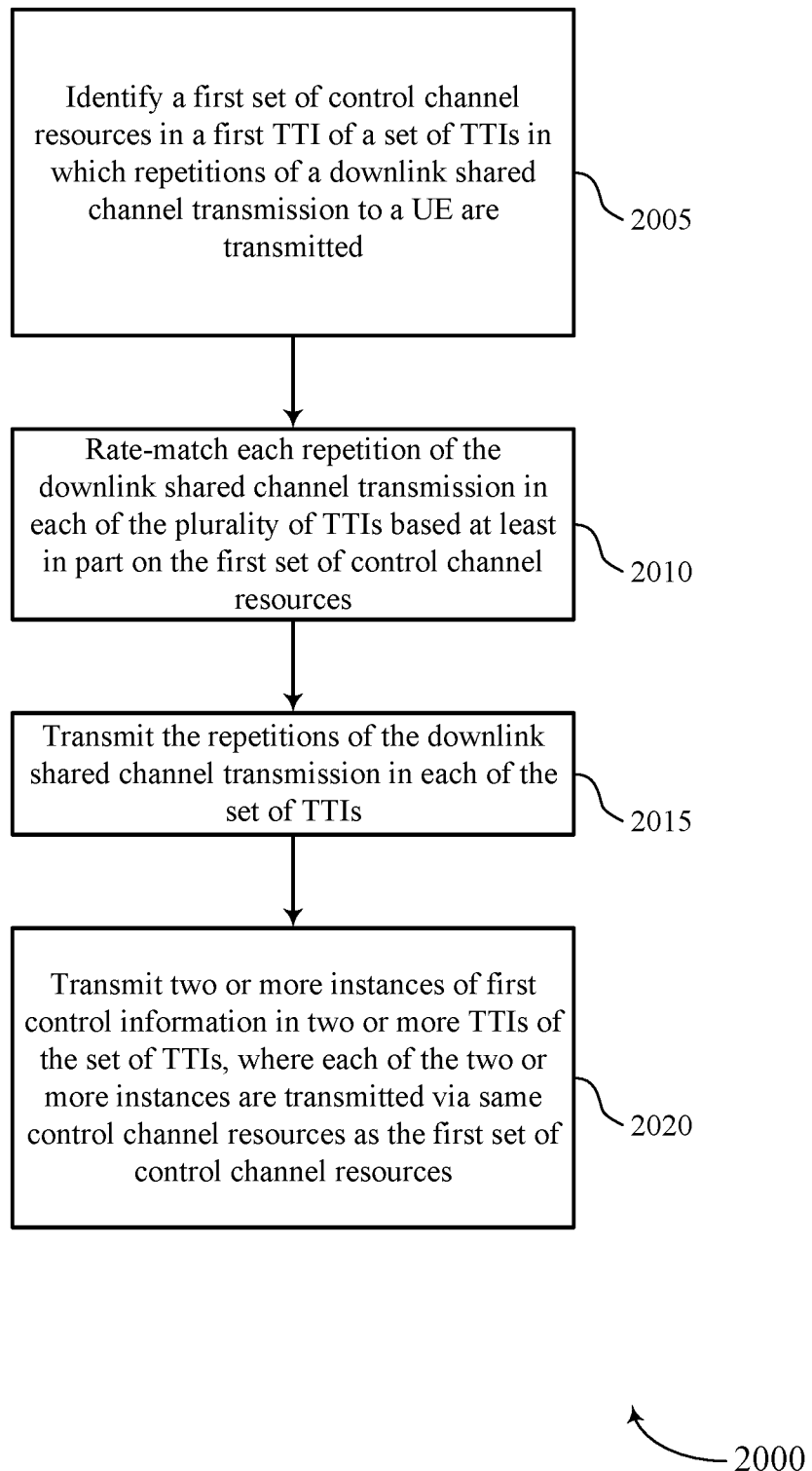

FIG. 20 shows a flowchart illustrating a method 2000 that supports rate-matching across downlink transmission repetitions in wireless communications in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may identify a first set of control channel resources in a first TTI of a set of TTIs in which repetitions of a downlink shared channel transmission to a UE are transmitted. The operations of 2005 may be performed according to the methods described herein. In some examples, aspects of the operations of 2005 may be performed by a DCI component as described with reference to FIGS. 12 through 15.

At 2010, the base station may rate-match each repetition of the downlink shared channel transmission in each of the plurality of TTIs based at least in part on the first set of control channel resources. The operations of 2010 may be performed according to the methods described herein. In some examples, aspects of the operations of 2010 may be performed by a rate-matching component as described with reference to FIGS. 12 through 15.

At 2015, the base station may transmit the repetitions of the downlink shared channel transmission in each of the set of TTIs. The operations of 2015 may be performed according to the methods described herein. In some examples, aspects of the operations of 2015 may be performed by a repetition manager as described with reference to FIGS. 12 through 15.

At 2020, the base station may transmit two or more instances of first control information in two or more TTIs of the set of TTIs, where each of the two or more instances are transmitted via same control channel resources as the first set of control channel resources. The operations of 2020 may be performed according to the methods described herein. In some examples, aspects of the operations of 2020 may be performed by a repetition manager as described with reference to FIGS. 12 through 15.

Figure 21:
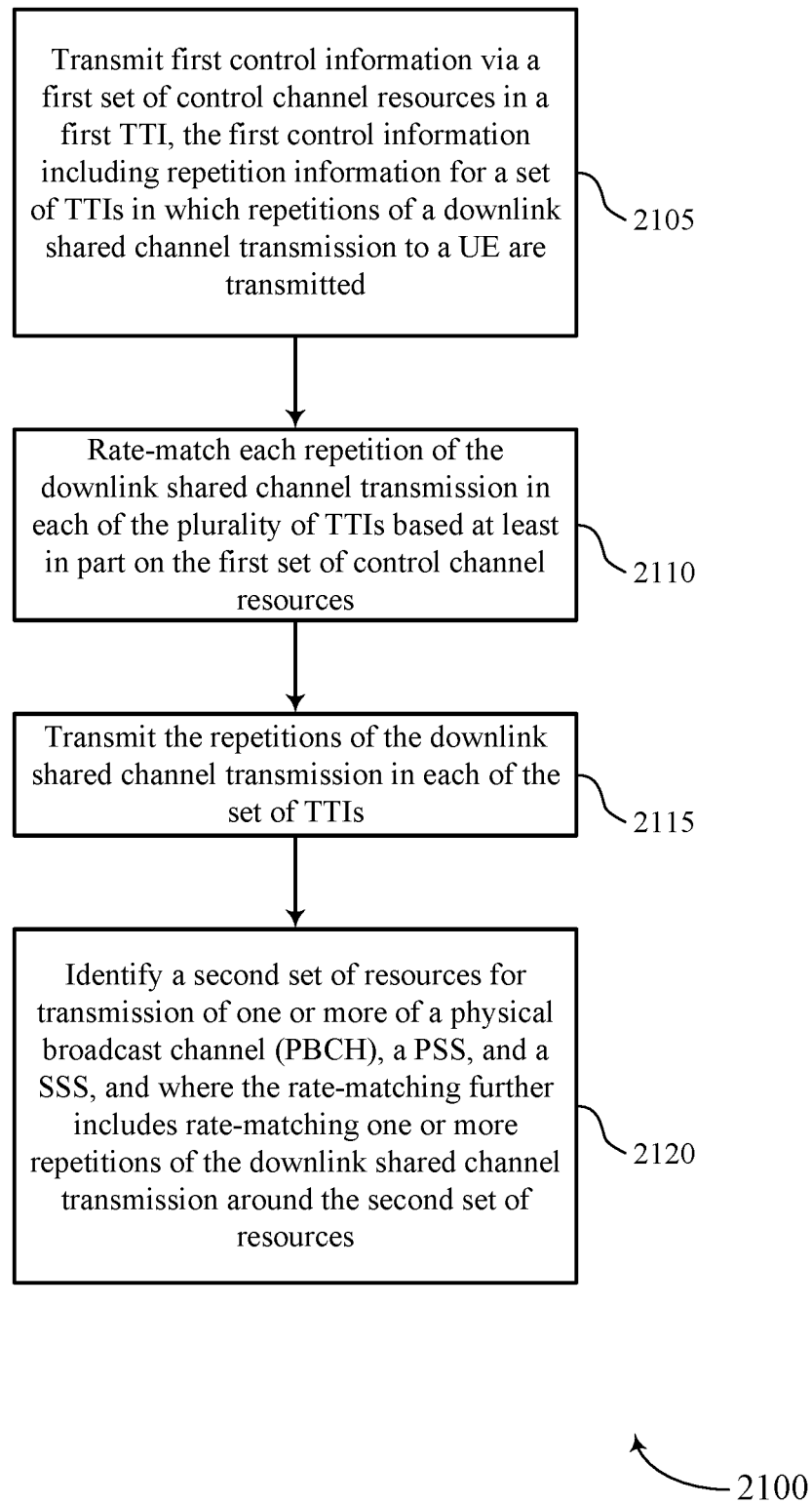

FIG. 21 shows a flowchart illustrating a method 2100 that supports rate-matching across downlink transmission repetitions in wireless communications in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may transmit first control information via a first set of control channel resources in a first TTI, the first control information including repetition information for a set of TTIs in which repetitions of a downlink shared channel transmission to a UE are transmitted. The operations of 2105 may be performed according to the methods described herein. In some examples, aspects of the operations of 2105 may be performed by a DCI component as described with reference to FIGS. 12 through 15.

At 2110, the base station may rate-match each repetition of the downlink shared channel transmission in each of the plurality of TTIs based at least in part on the first set of control channel resources. The operations of 2110 may be performed according to the methods described herein. In some examples, aspects of the operations of 2110 may be performed by a rate-matching component as described with reference to FIGS. 12 through 15.

At 2115, the base station may transmit the repetitions of the downlink shared channel transmission in each of the set of TTIs. The operations of 2115 may be performed according to the methods described herein. In some examples, aspects of the operations of 2115 may be performed by a repetition manager as described with reference to FIGS. 12 through 15.

At 2120, the base station may identify a second set of resources for transmission of one or more of a physical broadcast channel (PBCH), a PSS, and a SSS, and where the rate-matching further includes rate-matching one or more repetitions of the downlink shared channel transmission around the second set of resources. The operations of 2120 may be performed according to the methods described herein. In some examples, aspects of the operations of 2120 may be performed by a rate-matching component as described with reference to FIGS. 12 through 15.

Figure 22:
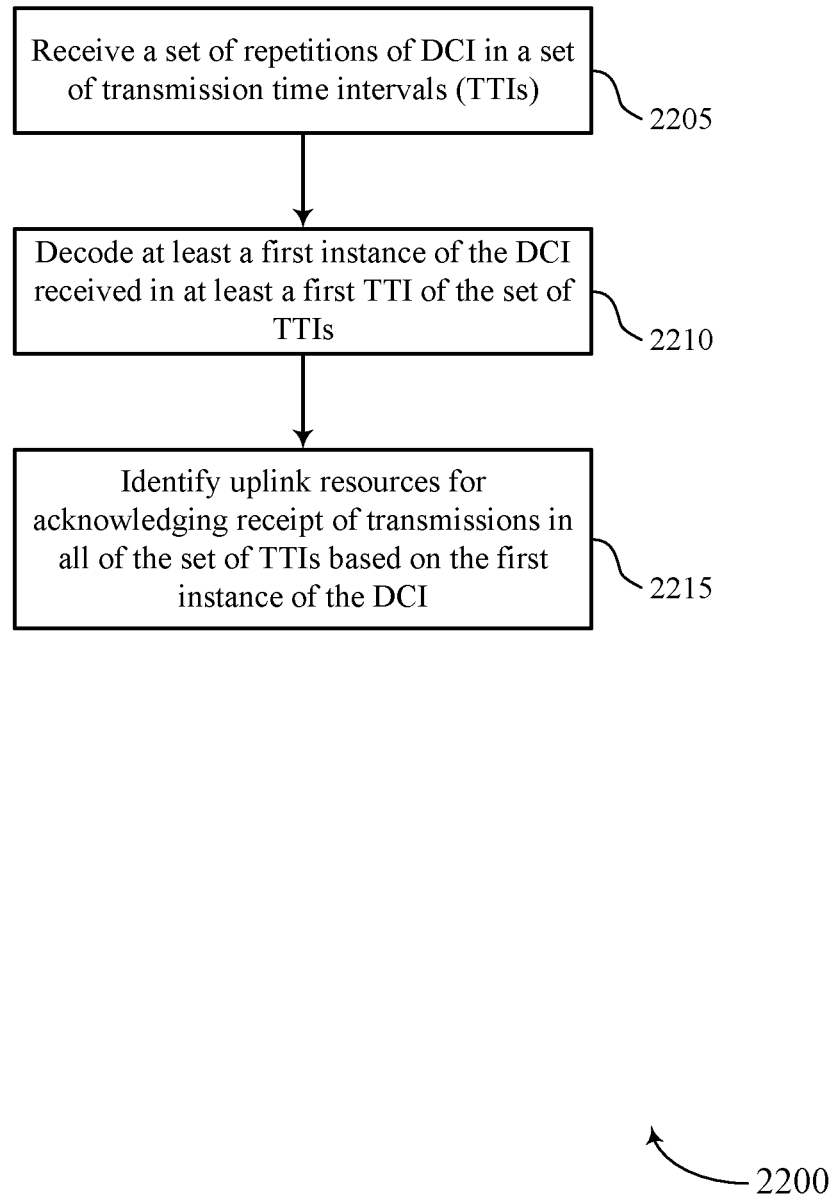

FIG. 22 shows a flowchart illustrating a method 2200 that supports rate-matching across downlink transmission repetitions in wireless communications in accordance with aspects of the present disclosure. The operations of method 2200 may be implemented by a UE 115 or its components as described herein. For example, the operations of method 2200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2205, the UE may receive a set of repetitions of DCI in a set of transmission time intervals (TTIs). The operations of 2205 may be performed according to the methods described herein. In some examples, aspects of the operations of 2205 may be performed by a DCI component as described with reference to FIGS. 8 through 11.

At 2210, the UE may decode at least a first instance of the DCI received in at least a first TTI of the set of TTIs. The operations of 2210 may be performed according to the methods described herein. In some examples, aspects of the operations of 2210 may be performed by a DCI component as described with reference to FIGS. 8 through 11.

At 2215, the UE may identify uplink resources for acknowledging receipt of transmissions in all of the set of TTIs based on the first instance of the DCI. The operations of 2215 may be performed according to the methods described herein. In some examples, aspects of the operations of 2215 may be performed by an uplink resource manager as described with reference to FIGS. 8 through 11.

Figure 23:
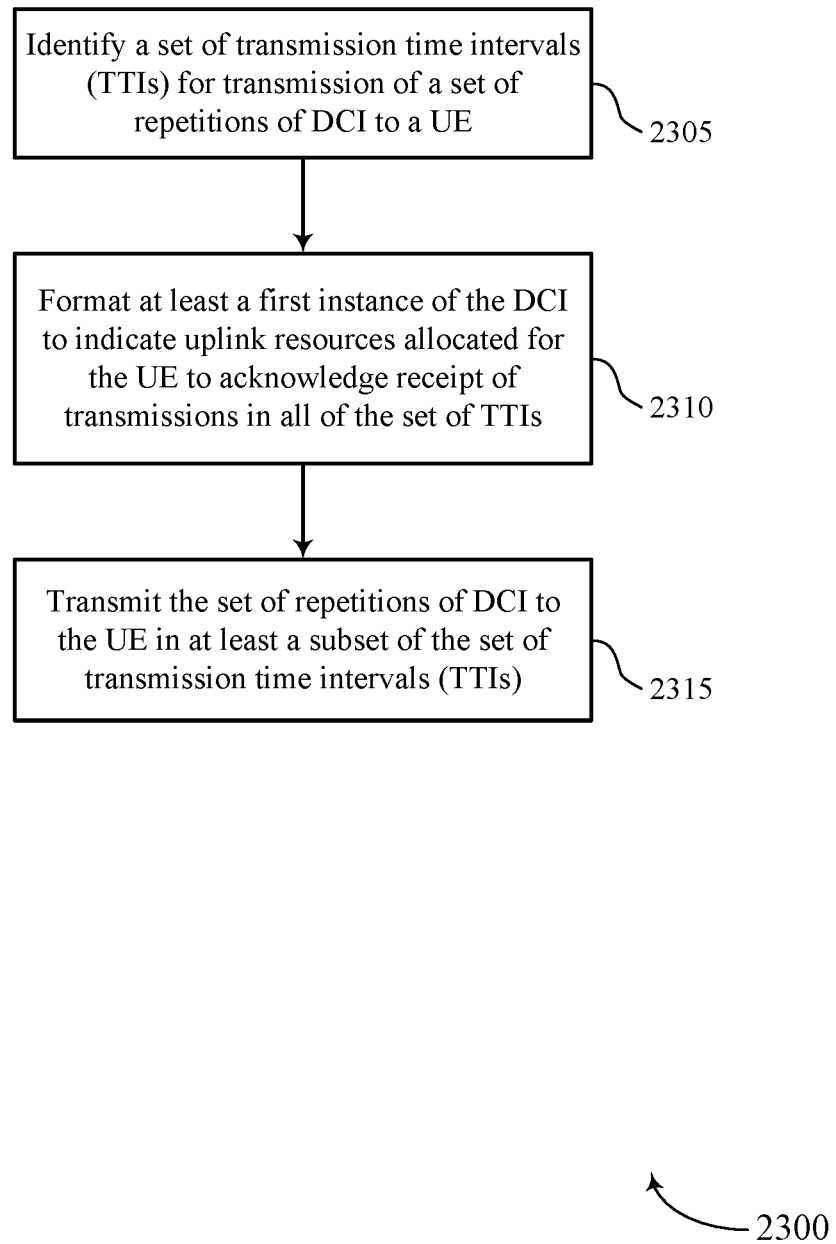

FIG. 23 shows a flowchart illustrating a method 2300 that supports rate-matching across downlink transmission repetitions in wireless communications in accordance with aspects of the present disclosure. The operations of method 2300 may be implemented by a base station 105 or its components as described herein. For example, the operations of method 2300 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2305, the base station may identify a set of transmission time intervals (TTIs) for transmission of a set of repetitions of DCI to a UE. The operations of 2305 may be performed according to the methods described herein. In some examples, aspects of the operations of 2305 may be performed by a repetition manager as described with reference to FIGS. 12 through 15.

At 2310, the base station may format at least a first instance of the DCI to indicate uplink resources allocated for the UE to acknowledge receipt of transmissions in all of the set of TTIs. The operations of 2310 may be performed according to the methods described herein. In some examples, aspects of the operations of 2310 may be performed by a DCI component as described with reference to FIGS. 12 through 15.

At 2315, the base station may transmit the set of repetitions of DCI to the UE in at least a subset of the set of transmission time intervals (TTIs). The operations of 2315 may be performed according to the methods described herein. In some examples, aspects of the operations of 2315 may be performed by a repetition manager as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Various embodiments are provided that may incorporate one or more aspects of the disclosure.

Embodiment 1

A method for wireless communication at a user equipment (UE), comprising: identifying a first set of control channel resources in a first transmission time interval (TTI) of a plurality of TTIs in which repetitions of a downlink shared channel transmission to the UE are transmitted; rate-matching each repetition of the downlink shared channel transmission in each of the plurality of TTIs based at least in part on the first set of control channel resources to identify shared channel resources in each of the plurality of TTIs; and receiving the downlink shared channel transmission via the shared channel resources in each of the plurality of TTIs.

Embodiment 2

The method of embodiment 1, wherein the first set of control channel resources comprises a subset of a set of resources configurable for control channel transmissions, and wherein the shared channel resources in each of the plurality of TTIs comprise at least a portion of the set of resources configurable for control channel transmissions.

Embodiment 3

The method of any of embodiments 1 or 2, wherein the first set of control channel resources are configured in the first control information semi-statically or dynamically.

Embodiment 4

The method of any of embodiments 1 or 2, wherein the first set of control channel resources are configured dynamically in the first control information, and wherein the rate-matching comprises: determining a rate-matching mode for the first set of control channel resources based at least on a dynamic indication field in the first control information; rate-matching the downlink shared channel transmission of the first TTI based at least in part on the determined rate-matching mode; and rate-matching each remaining TTI of the plurality of TTIs based at least in part on the rate-matching mode for the first set of control channel resources.

Embodiment 5

The method of embodiment 4, wherein the dynamic indication field indicates rate-matching around only the first control information or rate-matching around an entire resource block (RB) set and whether such rate-matching is performed in the presence or absence of control information within the TTI, and wherein the rate-matching each remaining TTI is performed according to the dynamic indication field and assuming that none of the remaining TTIs include control information.

Embodiment 6

The method of any of embodiments 1 to 3, wherein the rate-matching each remaining TTI is performed according to a semi-static configuration to rate-match around an entire resource block (RB) set or to not perform rate-matching in each remaining TTI after the first TTI.

Embodiment 7

The method of embodiment 6, wherein the semi-static configuration is provided via radio resource control (RRC) signaling.

Embodiment 8

The method of any of embodiments 1 to 7, wherein the repetition information for the plurality of TTIs in the first control information comprises a trigger to activate the repetitions of the downlink shared channel transmission.

Embodiment 9

The method of any of embodiments 1 to 8, further comprising: receiving two or more instances of the first control information in two or more TTIs of the plurality of TTIs, wherein each of the two or more instances are received via same control channel resources as the first set of control channel resources.

Embodiment 10

The method of any of embodiments 1 to 9, further comprising: identifying a second set of resources for transmission of one or more of a physical broadcast channel (PBCH), a primary synchronization signal (PSS), and a secondary synchronization signal (SSS), and wherein the rate-matching further comprises rate-matching one or more repetitions of the downlink shared channel transmission around the second set of resources.

Embodiment 11

The method of embodiments 10, wherein the rate-matching around the second set of resources is performed for each TTI of the plurality of TTIs irrespective of whether one or more of the PBCH, PSS, or SSS is scheduled in the TTI.

Embodiment 12

The method of any of embodiments 10 or 11, further comprising: determining that one or more resource blocks (RBs) of the downlink shared channel transmission of a second TTI is to be demodulated based at least in part on a demodulation reference signal (DMRS) scheduled in the first TTI; identifying that a DMRS occasion of at least a first RB collides with the second set of resources in the first TTI; and rate-matching the downlink shared channel transmission of the second TTI around the first RB in the second TTI.

Embodiment 13

The method of any of embodiments 1 to 12, wherein first control information in the first set of control channel resources indicates a number of repetitions of the downlink shared channel transmission.

Embodiment 14

An apparatus comprising at least one means for performing a method of any of embodiments 1 to 13.

Embodiment 15

An apparatus for wireless communications comprising a processor; memory in electronic communication with the processor; and instructions stored in the memory and executable by the processor to cause the apparatus to perform a method of any of embodiments 1 to 13.

Embodiment 16

A non-transitory computer-readable medium storing code for wireless communications, the code comprising instructions executable by a processor to perform a method of any of embodiments 1 to 13.

Embodiment 17

A method for wireless communication at a base station, comprising: identifying a first set of control channel resources in a first transmission time interval (TTI) of a plurality of TTIs in which repetitions of a downlink shared channel transmission to a user equipment (UE) are transmitted; rate-matching each repetition of the downlink shared channel transmission in each of the plurality of TTIs based at least in part on the first set of control channel resources; and transmitting the repetitions of the downlink shared channel transmission in each of the plurality of TTIs.

Embodiment 18

The method of embodiment 17, wherein the first set of control channel resources comprises a subset of a set of resources configurable for control channel transmissions, and wherein shared channel resources in each of the plurality of TTIs for the downlink shared channel transmissions comprise at least a portion of the set of resources configurable for control channel transmissions.

Embodiment 19

The method of any of embodiments 17 or 18, wherein the first set of control channel resources are configured in the first control information semi-statically or dynamically.

Embodiment 20

The method of any of embodiments 17 to 19, wherein the first set of control channel resources are configured dynamically in the first control information, and wherein the rate-matching comprises: dynamically determining a rate-matching mode for the first set of control channel resources; setting a dynamic indication field in the first control information to indicate the rate-matching mode to the UE; rate-matching the downlink shared channel transmission of the first TTI based at least in part on the determined rate-matching mode; and rate-matching each remaining TTI of the plurality of TTIs based at least in part on the rate-matching mode for the first set of control channel resources.

Embodiment 21

The method of embodiment 20, wherein the dynamic indication field indicates rate-matching around only the first control information or rate-matching around an entire resource block (RB) set and whether such rate-matching is performed in the presence or absence of control information within the TTI, and wherein the rate-matching each remaining TTI is performed according to the dynamic indication field and assuming that none of the remaining TTIs include control information.

Embodiment 22

The method of any of embodiments 17 to 19, further comprising: providing a semi-static configuration to the UE to rate-match around an entire resource block (RB) set or to not perform rate-matching in each remaining TTI after the first TTI.

Embodiment 23

The method of embodiment 22, wherein the semi-static configuration is provided via radio resource control (RRC) signaling.

Embodiment 24

The method of any of embodiments 17 to 23, further comprising: transmitting two or more instances of the first control information in two or more TTIs of the plurality of TTIs, wherein each of the two or more instances are transmitted via same control channel resources as the first set of control channel resources.

Embodiment 25

The method of any of embodiments 17 to 24, further comprising: identifying a second set of resources for transmission of one or more of a physical broadcast channel (PBCH), a primary synchronization signal (PSS), and a secondary synchronization signal (SSS), and wherein the rate-matching further comprises rate-matching one or more repetitions of the downlink shared channel transmission around the second set of resources.

Embodiment 26

The method of embodiment 25, wherein the rate-matching around the second set of resources is performed for each TTI of the plurality of TTIs irrespective of whether one or more of the PBCH, PSS, or SSS is scheduled in the TTI.

Embodiment 27

The method of any of embodiments 17 to 26, wherein the first control information indicates a number of repetitions of the downlink shared channel transmission.

Embodiment 28

An apparatus comprising at least one means for performing a method of any of embodiments 17 to 27.

Embodiment 29

An apparatus for wireless communications comprising a processor; memory in electronic communication with the processor; and instructions stored in the memory and executable by the processor to cause the apparatus to perform a method of any of embodiments 17 to 27.

Embodiment 30

A non-transitory computer-readable medium storing code for wireless communications, the code comprising instructions executable by a processor to perform a method of any of embodiments 17 to 27.

Embodiment 31

A method for wireless communication at a user equipment (UE), comprising: receiving a plurality of repetitions of downlink control information (DCI) in a plurality of transmission time intervals (TTIs); decoding at least a first instance of the DCI received in at least a first TTI of the plurality of TTIs; and identifying uplink resources for acknowledging receipt of transmissions in all of the plurality of TTIs based at least in part on the first instance of the DCI.

Embodiment 32

The method of embodiment 31, wherein the DCI indicates a number of repetitions of downlink shared channel transmission.

Embodiment 33

The method of any of embodiments 31 to 32, wherein each repetition of the DCI includes an index indicating a location of the uplink resources relative to a TTI of the plurality of TTIs containing the DCI, and wherein the index of each subsequent repetition of the DCI is adjusted to indicate a same location of the uplink resources.

Embodiment 34

The method of any of embodiments 31 to 33, wherein a location of the uplink resources is determined based at least in part on a first decoded instance of the DCI, and wherein one or more subsequent instances of the DCI are ignored.

Embodiment 35

The method of any of embodiments 31 to 34, wherein the decoding further comprises: combining multiple instances of the DCI, and wherein the uplink resources are further identified based at least in part on the combined DCI.

Embodiment 36

The method of any of embodiments 31 to 35, wherein the DCI includes an explicit indication of the uplink resources or an implicit indication of uplink resources based on an index of a starting control channel element (CCE) of the DCI.

Embodiment 37

The method of any of embodiments 31 to 36, wherein the DCI includes an implicit indication of uplink resources based on index of a starting control channel element (CCE) of the DCI.

Embodiment 38

The method of embodiment 37, wherein the starting CCE of the DCI is a same CCE for each of the plurality of repetitions of the DCI.

Embodiment 39

The method of embodiment 37, wherein the starting CCE of the DCI is a different CCE for at least one of the plurality of repetitions of the DCI, and wherein the implicit indication of the uplink resources is based on an index of the starting CCE of a first instance of the DCI.

Embodiment 40

An apparatus comprising at least one means for performing a method of any of embodiments 31 to 39.

Embodiment 41

An apparatus for wireless communications comprising a processor; memory in electronic communication with the processor; and instructions stored in the memory and executable by the processor to cause the apparatus to perform a method of any of embodiments 31 to 39.

Embodiment 42

A non-transitory computer-readable medium storing code for wireless communications, the code comprising instructions executable by a processor to perform a method of any of embodiments 31 to 39.

Embodiment 43

A method for wireless communication at a base station, comprising: identifying a plurality of transmission time intervals (TTIs) for transmission of a plurality of repetitions of downlink control information (DCI) to a user equipment (UE); formatting at least a first instance of the DCI to indicate uplink resources allocated for the UE to acknowledge receipt of transmissions in all of the plurality of TTIs; and transmitting the plurality of repetitions of DCI to the UE in at least a subset of the plurality of transmission time intervals (TTIs).

Embodiment 44

The method of embodiment 43, wherein the DCI indicates a number of TTIs of the plurality of TTIs.

Embodiment 45

The method of any of embodiments 43 or 44, wherein each repetition of the DCI includes an index indicating a location of the uplink resources relative to a TTI of the plurality of TTIs containing the DCI, and wherein the index of each subsequent repetition of the DCI is adjusted to indicate a same location of the uplink resources.

Embodiment 46

The method of any of embodiments 43 to 45, wherein a location of the uplink resources is determined based at least in part on a first decoded instance of the DCI, and wherein one or more subsequent instances of the DCI are ignored.

Embodiment 47

The method of any of embodiments 43 to 46, wherein: multiple instances of the DCI are combined at the UE, and wherein the multiple instances of the DCI include identical information.

Embodiment 48

The method of any of embodiments 43 to 47, wherein the DCI includes an explicit indication of the uplink resources.

Embodiment 49

The method of any of embodiments 43 to 48, wherein the DCI includes an implicit indication of uplink resources based on index of a starting control channel element (CCE) of the DCI.

Embodiment 50

The method of embodiment 49, wherein the starting CCE of the DCI is a same CCE for each of the plurality of repetitions of the DCI.

Embodiment 51

The method of embodiment 49, wherein the starting CCE of the DCI is a different CCE for at least one of the plurality of repetitions of the DCI, and wherein the implicit indication of the uplink resources is based on an index of the starting CCE of a first instance of the DCI.

Embodiment 52

An apparatus comprising at least one means for performing a method of any of embodiments 43 to 51.

Embodiment 53

An apparatus for wireless communications comprising a processor; memory in electronic communication with the processor; and instructions stored in the memory and executable by the processor to cause the apparatus to perform a method of any of embodiments 43 to 51.

Embodiment 54

A non-transitory computer-readable medium storing code for wireless communications, the code comprising instructions executable by a processor to perform a method of any of embodiments 43 to 51.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a first set of control channel resources in a first transmission time interval (TTI) of a plurality of TTIs in which repetitions of a downlink shared channel transmission to the UE are transmitted;
   rate-matching each repetition of the downlink shared channel transmission in each of the plurality of TTIs based at least in part on the first set of control channel resources to identify shared channel resources in each of the plurality of TTIs; and
   receiving the downlink shared channel transmission via the shared channel resources in each of the plurality of TTIs,
   wherein:
   the first set of control channel resources comprises a subset of a set of resources configurable for control channel transmissions,
   the shared channel resources in each of the plurality of TTIs comprise at least a portion of the set of resources configurable for control channel transmissions, and
   wherein the rate-matching comprises:
   determining a rate-matching mode for the first set of control channel resources based at least on a dynamic indication field in first control information;
   rate-matching the downlink shared channel transmission of the first TTI based at least in part on the determined rate-matching mode; and
   rate-matching each remaining TTI of the plurality of TTIs based at least in part on the rate-matching mode for the first set of control channel resources.

2. The method of claim 1, wherein the first set of control channel resources are configured semi-statically or dynamically.

3. The method of claim 1, wherein the dynamic indication field indicates rate-matching around only the first control information or rate-matching around an entire resource block (RB) set and whether such rate-matching is performed in the presence or absence of control information within the first TTI, and wherein the rate-matching each remaining TTI is performed according to the dynamic indication field and assuming that none of the remaining TTIs include control information.

4. The method of claim 1, wherein the rate-matching each remaining TTI is performed according to a semi-static configuration to rate-match around an entire resource block (RB) set.

5. The method of claim 4, wherein the semi-static configuration is provided via radio resource control (RRC) signaling.

6. The method of claim 1, wherein repetition information for the plurality of TTIs in first control information of the first TTI comprises a trigger to activate the repetitions of the downlink shared channel transmission.

7. The method of claim 1, further comprising:
   receiving two or more instances of first control information in two or more TTIs of the plurality of TTIs, wherein each of the two or more instances of first control information are received via same control channel resources as the first set of control channel resources.

8. The method of claim 1, further comprising:
   identifying a second set of resources for transmission of one or more of a physical broadcast channel (PBCH), a primary synchronization signal (PSS), and a secondary synchronization signal (SSS), and wherein the rate-matching further comprises rate-matching one or more repetitions of the downlink shared channel transmission around the second set of resources.

9. The method of claim 8, wherein the rate-matching around the second set of resources is performed for each TTI of the plurality of TTIs irrespective of whether one or more of the PBCH, PSS, or SSS is scheduled in the TTI.

10. The method of claim 8, further comprising:
determining that one or more resource blocks (RBs) of the downlink shared channel transmission of a second TTI is to be demodulated based at least in part on a demodulation reference signal (DMRS) scheduled in the first TTI;
identifying that a DMRS occasion of at least a first RB collides with the second set of resources in the first TTI; and
rate-matching the downlink shared channel transmission of the second TTI around the first RB in the second TTI.

11. The method of claim 1, wherein first control information in the first set of control channel resources indicates a number of repetitions of the downlink shared channel transmission.

12. A method for wireless communication at a base station, comprising:
identifying a first set of control channel resources in a first transmission time interval (TTI) of a plurality of TTIs in which repetitions of a downlink shared channel transmission to a user equipment (UE) are transmitted, wherein the first set of control channel resources comprises a subset of a set of resources configurable for control channel transmissions and shared channel resources in each of the plurality of TTIs for the downlink shared channel transmissions comprise at least a portion of the set of resources configurable for control channel transmissions;
rate-matching each repetition of the downlink shared channel transmission in each of the plurality of TTIs based at least in part on the first set of control channel resources, wherein the rate-matching comprises determining a rate-matching mode for the first set of control channel resources, setting a dynamic indication field in first control information to indicate the rate-matching mode to the UE, rate-matching the downlink shared channel transmission of the first TTI based at least in part on the determined rate-matching mode, and rate-matching each remaining TTI of the plurality of TTIs based at least in part on the rate-matching mode for the first set of control channel resources; and
transmitting the repetitions of the downlink shared channel transmission in each of the plurality of TTIs.

13. The method of claim 12, wherein the first set of control channel resources are configured semi-statically or dynamically.

14. The method of claim 13, wherein the dynamic indication field indicates rate-matching around only the first control information or rate-matching around an entire resource block (RB) set and whether such rate-matching is performed in the presence or absence of control information within a TTI, and wherein the rate-matching each remaining TTI is performed according to the dynamic indication field and assuming that none of the remaining TTIs include control information.

15. The method of claim 13, further comprising:
providing a semi-static configuration to the UE to rate-match around an entire resource block (RB) set.

16. The method of claim 15, wherein the semi-static configuration is provided via radio resource control (RRC) signaling.

17. The method of claim 12, further comprising:
transmitting two or more instances of first control information in two or more TTIs of the plurality of TTIs, wherein each of the two or more instances of first control information are transmitted via same control channel resources as the first set of control channel resources.

18. The method of claim 12, further comprising:
identifying a second set of resources for transmission of one or more of a physical broadcast channel (PBCH), a primary synchronization signal (PSS), and a secondary synchronization signal (SSS), and wherein the rate-matching further comprises rate-matching one or more repetitions of the downlink shared channel transmission around the second set of resources.

19. The method of claim 18, wherein the rate-matching around the second set of resources is performed for each TTI of the plurality of TTIs irrespective of whether one or more of the PBCH, PSS, or SSS is scheduled in the TTI.

20. An apparatus for wireless communication at a user equipment (UE), comprising:
a processor,
memory in electronic communication with the processor; and
instructions stored in the memory and executable by the processor to cause the apparatus to:
identify a first set of control channel resources in a first transmission time interval (TTI) of a plurality of TTIs in which repetitions of a downlink shared channel transmission to the UE are transmitted;
rate-match each repetition of the downlink shared channel transmission in each of the plurality of TTIs based at least in part on the first set of control channel resources to identify shared channel resources in each of the plurality of TTIs; and
receive the downlink shared channel transmission via the shared channel resources in each of the plurality of TTIs, wherein:
the first set of control channel resources comprises a subset of a set of resources configurable for control channel transmissions,
the shared channel resources in each of the plurality of TTIs comprise at least a portion of the set of resources configurable for control channel transmissions, and
wherein the rate-matching comprises:
determining a rate-matching mode for the first set of control channel resources based at least on a dynamic indication field in first control information;
rate-matching the downlink shared channel transmission of the first TTI based at least in part on the determined rate-matching mode; and
rate-matching each remaining TTI of the plurality of TTIs based at least in part on the rate-matching mode for the first set of control channel resources.

21. The apparatus of claim 20, wherein the first set of control channel resources are configured dynamically in first control information, and wherein the instructions are further executable by the processor to cause the apparatus to:
determine a rate-matching mode for the first set of control channel resources based at least on a dynamic indication field in the first control information.

22. The apparatus of claim 21, wherein the dynamic indication field indicates rate-matching around only the first control information or rate-matching around an entire resource block (RB) set and whether such rate-matching is performed in the presence or absence of control information within a TTI, and wherein the rate-matching of each remaining TTI is performed according to the dynamic indication field and assuming that none of the remaining TTIs include control information.

23. The apparatus of claim 21, wherein the rate-matching each remaining TTI is performed according to a semi-static configuration to rate-match around an entire resource block (RB) set.

24. An apparatus for wireless communication at a base station, comprising:
a processor,
memory in electronic communication with the processor; and
instructions stored in the memory and executable by the processor to cause the apparatus to:
identify a first set of control channel resources in a first transmission time interval (TTI) of a plurality of TTIs in which repetitions of a downlink shared channel transmission to a user equipment (UE) are transmitted, wherein the first set of control channel resources comprises a subset of a set of resources configurable for control channel transmissions and shared channel resources in each of the plurality of TTIs for the downlink shared channel transmissions comprise at least a portion of the set of resources configurable for control channel transmissions;
rate-match each repetition of the downlink shared channel transmission in each of the plurality of TTIs based at least in part on the first set of control channel resources, wherein rate matching includes determining a rate-matching mode for the first set of control channel resources, setting a dynamic indication field in the first control information to indicate the rate-matching mode to the UE, rate-matching the downlink shared channel transmission of the first TTI based at least in part on the determined rate-matching mode; and rate-matching each remaining TTI of the plurality of TTIs based at least in part on the rate-matching mode for the first set of control channel resources; and
transmit the repetitions of the downlink shared channel transmission in each of the plurality of TTIs.

25. The apparatus of claim 24, wherein the first set of control channel resources are configured dynamically in first control information.

26. The apparatus of claim 25, wherein the dynamic indication field indicates rate-matching around only the first control information or rate-matching around an entire resource block (RB) set and whether such rate-matching is performed in the presence or absence of control information within a TTI, and wherein the rate-matching each remaining TTI is performed according to the dynamic indication field and assuming that none of the remaining TTIs include control information.

27. The apparatus of claim 25, wherein the instructions are further executable by the processor to cause the apparatus to:
provide a semi-static configuration to the UE to rate-match around an entire resource block (RB) set or to not perform rate-matching in each remaining TTI after the first TTI.

* * * * *